(12) United States Patent
Kalman et al.

(10) Patent No.: US 11,886,714 B2
(45) Date of Patent: Jan. 30, 2024

(54) HIERARCHICAL CONSISTENCY GROUP FOR STORAGE AND ASSOCIATED METHODS THEREOF

(71) Applicant: NETAPP, INC., San Jose, CA (US)

(72) Inventors: Dean Alan Kalman, Cary, NC (US); Srikumar Natarajan, Cary, NC (US)

(73) Assignee: NETAPP, INC., San Jose, CA (US)

( * ) Notice: Subject to any disclaimer, the term of this patent is extended or adjusted under 35 U.S.C. 154(b) by 0 days.

(21) Appl. No.: 17/990,099

(22) Filed: Nov. 18, 2022

(65) Prior Publication Data

US 2023/0116890 A1 Apr. 13, 2023

Related U.S. Application Data

(63) Continuation of application No. 17/218,520, filed on Mar. 31, 2021, now Pat. No. 11,520,490.

(51) Int. Cl.
*G06F 3/06* (2006.01)
*G06F 11/07* (2006.01)
*G06F 11/14* (2006.01)

(52) U.S. Cl.
CPC .......... *G06F 3/0619* (2013.01); *G06F 3/0605* (2013.01); *G06F 3/065* (2013.01); *G06F 3/067* (2013.01); *G06F 3/0659* (2013.01); *G06F 11/0772* (2013.01); *G06F 11/1464* (2013.01); *G06F 11/1469* (2013.01)

(58) Field of Classification Search
CPC ...... G06F 3/0619; G06F 3/0605; G06F 3/065; G06F 3/0659; G06F 3/067; G06F 11/0772; G06F 11/1464; G06F 11/1469; G06F 16/128; G06F 16/178; G06F 16/273; G06F 2201/82; G06F 2201/84; G06F 11/1474; G06F 11/1484; G06F 11/2074; G06F 11/2076; G06F 11/2094; G06F 16/188; G06F 11/1446; H04L 41/40; H04L 41/0894
USPC .................................................. 711/162, 161
See application file for complete search history.

(56) References Cited

U.S. PATENT DOCUMENTS

| 8,712,970 | B1 | 4/2014 | Sim-Tang |
| 9,934,302 | B1 | 4/2018 | Cohen et al. |
| 2017/0228649 | A1 | 8/2017 | Chatterjee et al. |
| 2017/0315728 | A1 | 11/2017 | Zheng et al. |

(Continued)

OTHER PUBLICATIONS

International Search Report on corresponding PCT application No. PCT/US2022/019806 from International Searching authority (EPO) dated Jun. 15, 2022.

(Continued)

*Primary Examiner* — David Yi
*Assistant Examiner* — Zubair Ahmed
(74) *Attorney, Agent, or Firm* — LOZA & LOZA, LLP; Tejinder Singh

(57) ABSTRACT

Methods and systems for using a hierarchical consistency group (CG) in a storage system are provided. A parent CG is associated with at least a first child CG having a plurality of storage volumes. An atomic application programming interface (API) provisions the parent CG and the first child CG by allocating storage and storing policies for the parent CG and the first CG. A storage service selected from a backup service, a replication service and a cloning service for the parent CG and the first CG is executed based on the stored policies.

20 Claims, 16 Drawing Sheets

(56) References Cited

U.S. PATENT DOCUMENTS

2019/0340075 A1* 11/2019 Ramachandran ... G06F 11/2097
2020/0034041 A1    1/2020 Zhang et al.
2020/0401315 A1   12/2020 Chen et al.

OTHER PUBLICATIONS

Written Opinion on corresponding PCT application No. PCT/US2022/019806 from International Searching Authority (EPO) dated Jun. 15, 2022.

* cited by examiner

HIERARCHICAL CONSISTENCY GROUP FOR STORAGE AND ASSOCIATED METHODS THEREOF

CROSS-REFERENCE TO RELATED APPLICATIONS

This patent application claims priority of and is a continuation of U.S. patent application Ser. No. 17/218,520, filed on Mar. 31, 2021, the disclosure of which is incorporated herein by reference in its entirety.

TECHNICAL FIELD

The present disclosure generally relates to storage systems, and more particularly, to computing technology for generating and using a hierarchical, consistency group object model for data management and data protection in a storage system.

BACKGROUND

Various forms of storage systems are used today. These forms include direct attached storage, network attached storage (NAS) systems, storage area networks (SANs), cloud-based storage and others. Storage systems are commonly used for a variety of purposes, such as providing multiple users with access to shared data, backing up data and others. A storage system typically includes at least one computing system (may also be referred to as a "server", "storage server", "storage node", "storage system node" or "storage controller") executing a storage operating system configured to store and retrieve data on behalf of one or more computing systems at one or more storage devices.

The storage operating system can use one or more consistency groups (CG) to protect data. A CG is a container (i.e. a logical structure) with a plurality of volumes that are managed as a single entity. A storage volume (or a logical unit number ("LUN") is a logical object presented to computing devices to store and protect data. CGs are used to take simultaneous snapshot images of multiple volumes at a point in time. CGs are typically used for applications that utilize multiple volumes, for example, a database application with a log volume to store transaction and archive logs and a data volume to store data.

Conventional CGs are single level. This means that each CG with multiple volumes operates as an independent logical object that is tracked and managed separately. This can be inefficient, especially for CGs that are related to a single application instance. For example, a database application may have a first CG with multiple volumes that stores data for the database. A second CG may include multiple volumes to store log information for the database. A storage system has to individually configure and manage the first CG and the second CG for storing and protecting information stored by the two CGs. This is inefficient for the storage system because the storage system executes extra operations to configure and manage multiple CG objects, and therefore, this is undesirable. Continuous efforts are being made to develop computing technology for efficiently handling CGs and the data stored within the CGs in storage systems.

BRIEF DESCRIPTION OF THE DRAWINGS

The various features of the present disclosure will now be described with reference to the drawings of the various aspects disclosed herein. In the drawings, the same components may have the same reference numerals. The illustrated aspects are intended to illustrate, but not to limit the present disclosure. The drawings include the following Figures.

DETAILED DESCRIPTION

Figure 1A:
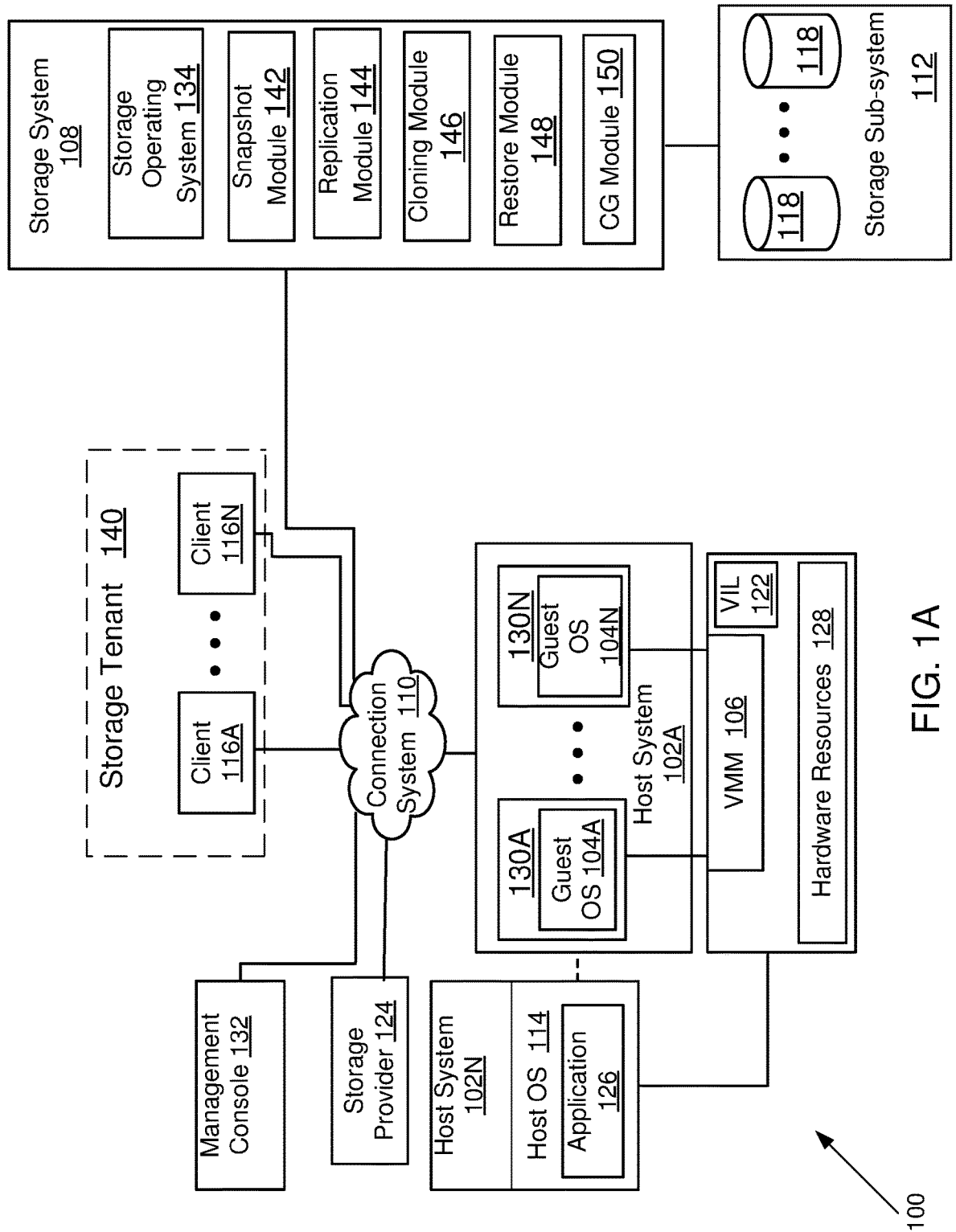
FIG. 1A shows an example of an operating environment for the various aspects of the present disclosure.

In one aspect, innovative storage system technology using a hierarchical consistency group ("CG") object model is disclosed. Instead of the conventional single-level, CG model, the hierarchical CG model enables a storage system to create a parent CG with child CGs. The parent CG can be associated with an application to store data using multiple child CGs. The parent CG and the child CGs can be provisioned in an atomic, single application programming interface (API) call. Provisioning, in this context means configuring the parent and child CGs, configuring the storage volumes, setting up protocol and user access controls, applying best practices such as thin provisioning, setting up snapshot schedules, establishing snapshot sequencing, when applicable, and establishing quality of service (QoS) policies, described below in detail. Before the innovative hierarchical CG model of the present disclosure, in conventional single level CG solutions, it may take numerous API calls/operations to provision CGs. The extra operations use storage system resources introduce additional failure states for a user to deal with and hence are undesirable.

In another aspect, the hierarchical CG model enables a storage system to add a volume to a child CG and automatically associate the volume with the parent CG. Furthermore, existing volumes of child CGs can be easily reassigned without impacting the parent CG. QoS policies including a number of input/output operations per second ("IOPS"), latency, and/or throughput can be shared across the parent and child CGs, applied to individual child volumes, or applied per volume. IOPS are number of read and write requests (also referred to as "I/O" requests) that are processed by one or more volumes. Latency is the delay in processing I/O requests and throughput indicates the amount of data that is process by a volume.

In yet another aspect, a storage management system can monitor performance of the parent CG and the child CGs as a single entity or separate entities. The performance includes space usage by the parent CG and the child CGs. Storage services including backups, replication, cloning, and migration related to the parent CG and the child CGs are executed based on individual schedules from a single hierarchical object, as described below in detail. The technology disclosed herein provides a faster and easier mechanism to manage the stored data and the hierarchical CGs vis-à-vis single-level, flat CGs, as described below in detail.

As a preliminary note, the terms "component", "module", "system," and the like as used herein are intended to refer to a computer-related entity, either software-executing general-purpose processor, hardware, firmware and a combination thereof. For example, a component maybe, but is not limited to being, a process running on a hardware processor, a hardware processor, an object, an executable, a thread of execution, a program, and/or a computer.

By way of illustration, both an application running on a server and the server can be a component. One or more components may reside within a process and/or thread of execution, and a component can be localized on one computer and/or distributed between two or more computers. Also, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal).

Computer executable components can be stored, for example, at non-transitory, computer readable media including, but not limited to, an ASIC (application specific integrated circuit), CD (compact disc), DVD (digital video disk), ROM (read only memory), floppy disk, hard disk, storage class memory, solid state drive or any other non-volatile memory, EEPROM (electrically erasable programmable read only memory), memory stick or any other storage device type, in accordance with the claimed subject matter.

System 100: FIG. 1A shows an example of a networked storage environment 100 (also referred to as system 100), for implementing the various adaptive aspect of the present disclosure. System 100 may include a plurality of computing devices 102A-102N (may also be referred to as a "host system 102," "host systems 102", "computing device 102", "computing devices 102", "server 102" or "servers 102") communicably coupled via a connection system 110 (e.g. a local area network (LAN), wide area network (WAN), the Internet and others) to a storage system 108 (may also be referred to as "storage server 108", "storage controller 108", "storage node 108", "storage nodes 108", "storage system node 108" or "storage system nodes 108") that executes a storage operating system 134 for storing and retrieving data to and from a storage subsystem 112 having mass storage devices 118. As used herein, the term "communicably coupled" may refer to a direct connection, a network connection, or other connections to enable communication between devices.

In one aspect, the storage operating system 134 includes or interfaces with a snapshot module 142, a replication module 144, a cloning module 146 and a restore module 148, described below in detail. A CG module 150 maintains a hierarchical CG object model (e.g., 149, FIG. 1C) in contrast with the single level CG object (e.g., 147, FIG. 1B). The term snapshot as used throughout this specification means a "point in time" copy of an active file system that uses storage volumes/logical unit numbers (LUNs) for storing data. The snapshot is a persistent, point in time (PPT) image of the active file system. The snapshot includes metadata that provides a snapshot identifier, a size of the snapshot, a volume identifier that identifies a volume associated with the snapshot, a timestamp indicating when the snapshot was taken, and other information.

As an example, host system 102A may execute a plurality of virtual machines (VMs) in a virtual environment that is described below in detail. Host 102N may execute one or more application 126, for example, a database application, an email application or any other application type to use the storage system 108 for storing information in storage devices 118. It is noteworthy that although some aspects of the present disclosure are described below with respect to a database application, referring application 126 to as database application 126, the adaptive aspects are not limited to database applications. Host 102N also executes an operating system 114, for example, a Windows based operating system, Linux, Unix and others (without any derogation of any third-party trademark rights) to control the overall operations of host 102N.

Clients (also referred to as users) 116A-116N are computing devices that can access storage space at the storage system 108 via the connection system 110. A client can be the entire system of a company, a department, a project unit or any other entity. Each client is uniquely identified and, optionally, may also be a part of a logical structure called a storage tenant 140. The storage tenant 140 represents a set of users (may also be referred to as storage consumers) for a storage provider 124 (may also be referred to as a cloud manager, where cloud computing is utilized) that provides access to storage system 108. It is noteworthy that the adaptive aspects of the present disclosure are not limited to using a storage provider or a storage tenant, and instead, can be implemented for direct client access.

In one aspect, the storage operating system 134 has access to storage devices 118 of the storage subsystem 112. The storage devices 118 may include solid state drives (SSDs), storage class memory, writable storage device media such as hard disk drives (HDD), magnetic disks, video tape, optical, DVD, magnetic tape, and/or any other similar media adapted to store electronic information. The storage devices 118 can be organized as one or more groups of Redundant Array of Independent (or Inexpensive) Disks (RAID). The various aspects disclosed are not limited to any specific storage device type or storage device configuration.

As an example, the storage operating system 134 may provide a set of storage volumes (or LUNs)) that present storage space to host systems 102, clients 116, and/or VMs (e.g. 130A/130N, described below) for storing information. Each volume can be configured to store data containers (e.g. files, directories, structured or unstructured data, or data objects), scripts, word processing documents, executable programs, and any other type of structured or unstructured data. From the perspective of one of the client systems, each volume can appear to be a single drive. However, each volume can represent storage space at one storage device, an aggregate of some or all of the storage space in multiple storage devices, a RAID group, or any other suitable set of storage space. The term file/files as used herein include data container/data containers, directory/directories, and/or data object/data objects with structured or unstructured data.

In one aspect, storage operating system 134 is a write anywhere file system (WAFL). A WAFL type operating system does not rewrite a block, instead, allocates a new block for each rewrite operation, i.e. a new block is allocated for each write operation. The various aspects disclosed herein are not limited to any specific file system type and can be implemented by other file systems and storage operating systems.

The storage operating system 134 organizes storage space at the storage subsystem 112 as one or more "aggregate", where each aggregate is identified by a unique identifier and a location. Within each aggregate, one or more storage volumes are created whose size can be varied. A qtree, sub-volume unit may also be created within the storage volumes. As a special case, a qtree may also be an entire storage volume.

The storage system 108 can be used to store and manage information at storage devices 118. A request to store or read data can be based on file-based access protocols, for example, the Common Internet File System (CIFS) protocol or Network File System (NFS) protocol, over TCP/IP (Transmission Control Protocol/Internet Protocol). Alternatively, the request may use block-based access protocols, for example, iSCSI (Internet Small Computer Systems Interface) and SCSI encapsulated over Fibre Channel (FCP).

To facilitate access to storage space, the storage operating system 134 implements a file system (also referred to as file system manager 240, FIG. 2B) that logically organizes stored information as a hierarchical structure for files/directories/objects at the storage devices. Each "on-disk" file can be implemented as a set of data blocks configured to store information, such as text, whereas a directory can be implemented as a specially formatted file in which other files and directories are stored. The data blocks are organized within a volume block number (VBN) space that is maintained by the file system. The file system may also assign each data block in the file a corresponding "file offset" or file block number (FBN). The file system typically assigns sequences of FBNs on a per-file basis, whereas VBNs are assigned over a larger volume address space. The file system organizes the data blocks within the VBN space as a logical volume. The file system typically may include a contiguous range of VBNs from zero to n, for a file system of size n−1 blocks.

The storage operating system 134 may further implement a storage module (for example, a RAID system for the storage subsystem 112) that manages the storage and retrieval of the information to and from storage devices 118 in accordance with input/output (110) operations. In a typical mode of operation, a computing device (e.g. host system 102, client 116 or any other device) transmits one or more I/O requests over connection system 110 to the storage system 108. Storage system 108 receives the I/O requests, issues one or more I/O commands to storage devices 118 to read or write data on behalf of the computing device, and issues a response containing the requested data over the network 110 to the respective client system.

When accessing a Hock of a file in response to servicing a client request, the file system specifies a VBN that is translated at the file system/RAID system boundary into a disk block number ("DBN") (or a physical volume block number ("PVBN") location on a particular storage device (storage device, DBN) within a RAID group of the physical volume). A requested Hock is retrieved from one of the storage devices 118 and stored in a buffer cache (not shown) of a memory of the storage system 108 as part of a buffer tree of a data container. The buffer tree is an internal representation of blocks for a file stored in the buffer cache and maintained by the file system manager. Broadly stated, the buffer tree has an mode at the root (top-level) of the file. An inode is a data structure used to store information, such as metadata, about a file, whereas the data blocks are structures used to store the actual data for the file. The information in an inode may include, e.g., ownership of the file, file modification time, access permission for the file, size of the file, file type and references to locations on storage devices 118 of the data blocks for the file. The references to the locations of the file data are provided by pointers, which may further reference indirect blocks that, in turn, reference the data blocks, depending upon the amount of data in the file. Each pointer can be embodied as a VBN facilitate efficiency among the file system and the RAID system when accessing the data.

As mentioned above, system 100 may also include a virtual machine environment where a physical resource is time-shared among a plurality of independently operating processor executable virtual machines (VMs). Each VM may function as a self-contained platform, running its own operating system (OS) and computer executable application software. The computer executable instructions running in a VM may also be collectively referred to herein as "guest software." In addition, resources available within the VM may also be referred to herein as "guest resources."

The guest software expects to operate as if it were running on a dedicated computer rather than in a VM. That is, the guest software expects to control various events and have access to hardware resources on a physical computing system (may also be referred to as a host system) which may also be referred to herein as "host hardware resources". The host hardware resources may include one or more processors, resources resident on the processors (e.g., control registers, caches and others), memory (instructions residing in memory, e.g., descriptor tables), and other resources (e.g., input/output devices, host attached storage, network attached storage or other like storage) that reside in a physical machine or are coupled to the host system.

As shown in FIG. 1A, host system 102A includes/provides a virtual machine environment executing a plurality of VMs 130A-130N (also referred to as VM 130 or VMs 130) that can be presented to client computing devices/systems 116A-116N. VMs 130 execute a plurality of guest OS 104A-104N (may also be referred to as guest OS 104) that share hardware resources 128. Application 126 (also referred to as database application 126) may also be executed within VMs 130 to access the storage system 108. As described above, hardware resources 128 may include storage, CPU, memory, I/O devices or any other hardware resource.

In one aspect, host system 102A interfaces with or includes a virtual machine monitor (VMM) 106, for example, a processor executed Hyper-V layer provided by Microsoft Corporation, a hypervisor layer provided by VMWare Inc., or any other type (without derogation of any third party trademark rights). VMM 106 presents and manages the plurality of guest OS 104A-104N executed by the host system 102A. The VMM 106 may include or interface with a virtualization layer (VIL) 122 that provides one or more virtualized hardware resource to each OS 104A-104N.

In one aspect, VMM 106 is executed by host system 102A with VMs 130. In another aspect, VMM 106 can be executed by an independent stand-alone computing system, referred to as a hypervisor server or VMM server and VMs 130 are presented at one or more computing systems.

It is noteworthy that different vendors provide different virtualization environments, for example, VMware Inc., Microsoft Corporation and others. Data centers may have hybrid virtualization environments/technologies, for example, Hyper-V and hypervisor based virtual environments. The generic virtualization environment described above with respect to FIG. 1A can be customized to implement the various aspects of the present disclosure. Furthermore, VMM 106 (or VIL 122) may execute other modules, for example, a storage driver, network interface and others. The virtualization environment may use different hardware and software components and it is desirable for one to know an optimum/compatible configuration.

In one aspect, system 100 uses a management console 132 for configuring and managing the various components of system 100. As an example, the management console 132 can be implemented as or include one or more application programming interfaces (APIs) that are used for managing one or more components of system 100. The APIs can be implemented as REST APIs, where REST means "Representational State Transfer". REST is a scalable system used for building web services. REST systems/interfaces may use HTTP (hyper-text transfer protocol) or other protocols for communicating with one or more devices of system 100.

Although storage system 108 is shown as a stand-alone system, i.e. as a non-cluster based system, in another aspect, storage system 108 may have a distributed architecture, for example, a cluster-based storage system that is described below in detail with respect to FIG. 2A.

Figure 1B:
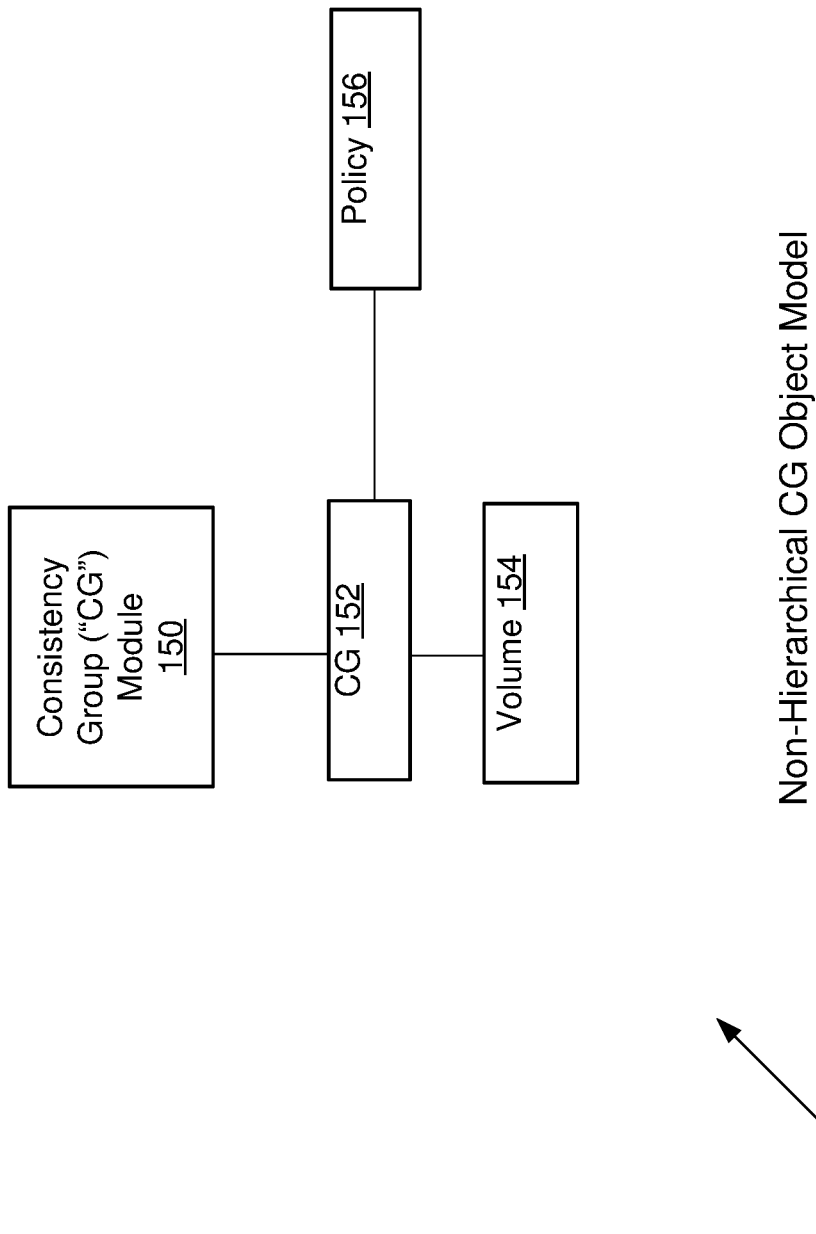
FIG. 1B shows an example of a conventional single level, consistency group ("CG").

Single Level CG Object Model: FIG. 1B shows an example of a non-hierarchical, single level CG object model 147 that is used by conventional storage systems. A CG 152 can be assigned one or more volumes 154. Policy 156 is associated with CG 152. If an application requires multiple CGs, for example, a database application that may have a CG for data volumes and a CG for log volumes with different policies and requirements, then each CG is configured, monitored and provisioned separately. This requires multiple operations using multiple APIs, consuming computing resources and adding complexity to implementing and managing the multiple CGs. The present disclosure overcomes the shortcomings of the single level CG object model, as described below in detail.

Figure 1C:
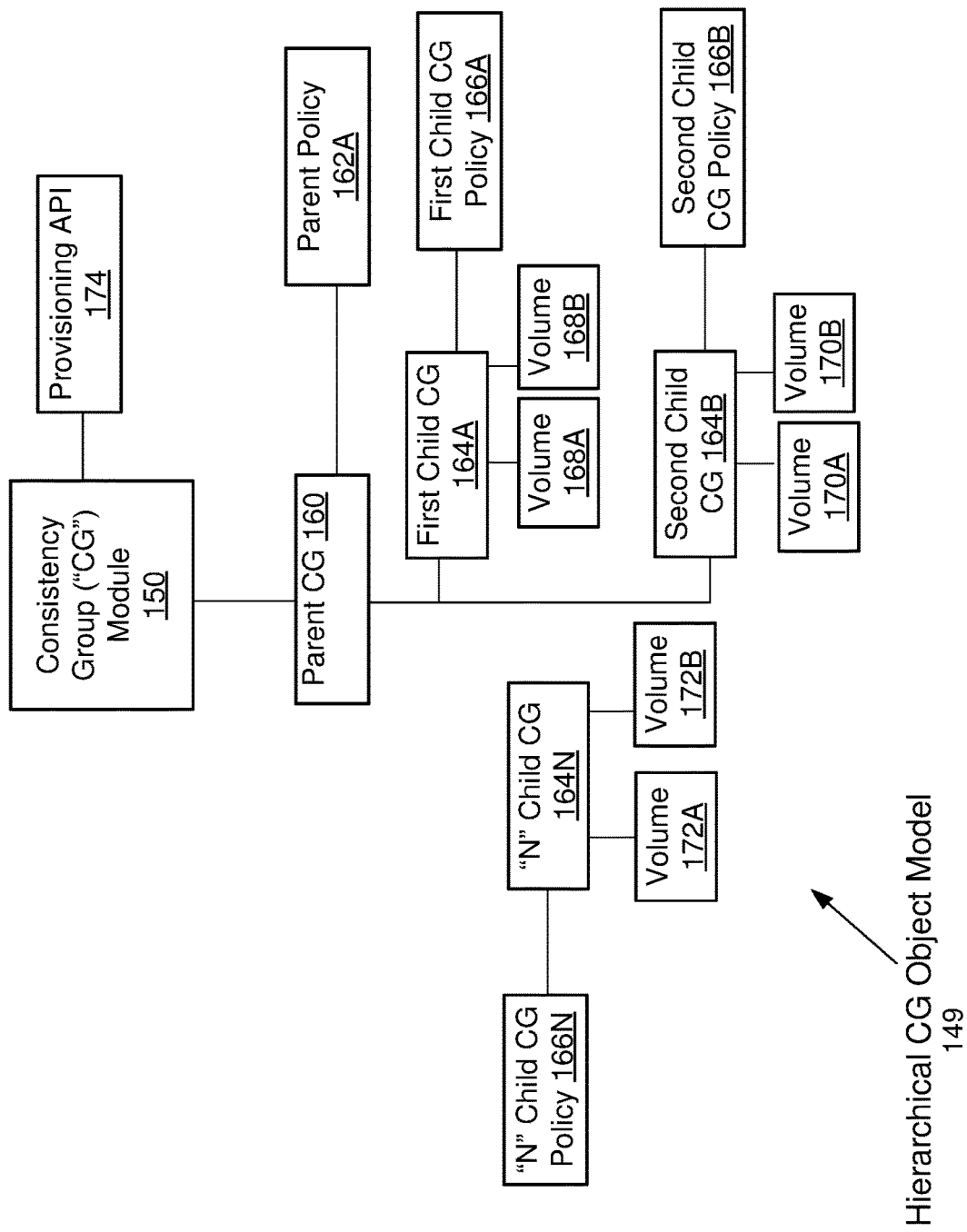
FIG. 1C shows an example of hierarchical CG object model, according to aspects of the present disclosure.

Hierarchical CG Object Model: FIG. 1C shows an example of a hierarchical CG object model 149 ("Model 149"), according to one aspect of the present disclosure. Model 149 includes a parent CG 160 and child CGs 164A-164N (may also be referred to as child CG 164 or child CGS 164). In one aspect, the parent CG 160 may represent a suite of different applications and each child CG 164 represents a specific application instance with associated volumes. In another aspect, the parent CG 160 can be configured for an application instance, e.g. a database application instance, while each child CG 164 represents a different volume type, e.g., a data volume and a log volume. The parent CG and the child CGs 164 are provisioned using a provisioning API 174

The parent CG 160 is associated with a parent policy 162A at the application level. The parent policy 162A may indicate a snapshot schedule for the parent CG 160, a QoS policy, a replication policy, a cloning policy or any other policy. The policy information is stored at a policy data structure (e.g., 502, FIG. 6), described below in detail.

In one aspect, the parent CG 160 is associated with multiple child CGs, e.g., a first child CG 164A, a second child CG 164B and a "N" child CG 164N. The first child CG 164A is associated with a policy 166A and is assigned volumes 168A/168B. The second child CG 164B is associated with a policy 166B and is assigned volumes 170A/170B. The N child CG 164N is associated with policy 166N and is assigned volumes 172A-172B.

Policies 162A, 166A, 166B and 166N may specify different requirements. For example, policy 166A may have a different snapshot schedule than policy 166B. Policy 162A may indicate that a snapshot of child CG 164A is to be taken before the snapshot of child CG 164B, i.e. the snapshots are "sequenced." Although FIG. 1C shows that each child CG has two volumes, the disclosure is not limited any specific number of volumes assigned to each child CG.

In one aspect, any configuration changes to the parent policy 162A can flow to child CGs 164 or vice-versa, i.e. a change to a child CG policy may flow up to the parent CG 164A. For example, a QOS policy that is set for the parent CG 164A is associated with all the volumes of the child CGs. When a storage volume is added to a child CG, for example, 168B, then the added volume is also associated with the parent CG 160. It is noteworthy that a volume of a child CG can be reassigned to another child CG but still remains under the parent CG 160. For example, if volume 168B is reassigned to the second child CG 164B, it remains associated with the parent CG 164A.

In one aspect, the parent and the child CGs are provisioned using a single, atomic provisioning REST API 174 that is provided by the storage operating system 134. This is in contrast to conventional systems where multiple APIs and API calls are used to configure different single-level CGs.

In one aspect, the management console 132 obtains performance data from the storage operating system 134 regarding the parent CG 160 and the child CGs 164A-164N, including storage space used by the parent CG 160 and the child CGs 164. The performance data can include IOPS processed by the parent CG 160, the child CGs 164 and the volumes of each child CG, latency in reading and writing data, compliance with service level agreements or any other performance information. The performance data is used by the management console 132, executing a management application (not shown) to load balance and manage storage at the parent and child CG levels. This is more efficient than managing individual CGs of an application.

In one aspect, when the parent CG 160 is associated with multiple applications, the storage operating system 134 tracks performance data for each child CG 164 that may represent individual applications. The performance data enables the management console 132 to efficiently track performance of each application using the hierarchical model of FIG. 1C. Details of configuring CGs using model 149 are provided below with respect to the process flow of FIG. 3, and details of providing storage services, e.g., backup, cloning, replication, and migration using model 149 are described below with respect to the process flows of FIGS. 4A-4E

Clustered Storage System: Before describing the details of FIGS. 3 and 4A-4E, the following describes a clustered-based, networked storage system utilizing the object model 149, according to one aspect of the present disclosure. FIG. 2A shows the cluster-based, networked storage environment (may also be referred to as "storage environment") 200 with a plurality of storage system nodes (208.1-208.3) operating to store data on behalf of clients at storage devices 118.1-118.3 (similar to 118, FIG. 1A). Storage environment 200 may include a plurality of client systems 204.1-204.N (may also be referred to as "client system 204" or "client systems 204") as part of or associated with storage tenant 140, a clustered storage system 202 (similar to the storage system 108 of FIG. 1A) and at least a network 206 communicably connecting the host system 102A-102N, client systems 204.1-204.N (similar to 116A-116N), the management console 132, the storage (or cloud) provider 124 and the clustered storage system 202. It is noteworthy that these components may interface with each other using more than one network having more than one network device.

The clustered storage system 202 includes the plurality of storage system nodes 208.1-208.3 (also referred to as "node 208" or "nodes 208"), a cluster switching fabric 210, and a plurality of mass storage devices 118.1-118.3 (similar to 118, FIG. 1A). Each of the plurality of nodes 208.1-208.3 is configured to include a network module, a storage module, and a management module, each of which can be implemented as a processor executable module. Specifically, node 208.1 includes a network module 214.1, a storage module 216.1, and a management module 218.1, node 208.2 includes a network module 214.2, a storage module 216.2, and a management module 218.2, and node 208.3 includes a network module 214.3, a storage module 216.3, and a management module 218.3.

The network modules 214.1-214.3 include functionality that enable the respective nodes 208.1-208.3 to connect to one or more of the host systems 102A-102N, and the client systems 204.1-204.N (or the management console 132) over the network 206. The network modules 214.1-214.3 handle network file protocol processing (for example, CFS, NFS and/or iSCSI requests). The storage modules 216.1-216.3 connect to one or more of the storage devices 118.1-118.3 and process I/O requests. Accordingly, each of the plurality of nodes 208.1-208.3 in the clustered storage server arrangement provides the functionality of a storage server.

The management modules 218.1-218.3 provide management functions for the clustered storage system 202. The management modules 218.1-218.3 collect storage information regarding storage devices, such as storage devices 118.1-118.3.

A switched virtualization layer including a plurality of virtual interfaces (VIFs) 219 is provided to interface between the respective network modules 214.1-214.3 and the client systems 204.1-204.N, allowing storage space at the storage devices associated with the nodes 208.1-208.3 to be presented to the client systems 204.1-204.N as a single shared storage pool.

The clustered storage system 202 can be organized into any suitable number of storage virtual machines (SVMs) (may also be referred to as virtual servers (may also be referred to as "SVMs")), in which each SVM represents a single storage system namespace with separate network access. A SVM can be designated as a resource on system 200. Each SVM has a client domain and a security domain that are separate from the client and security domains of other SVMs. Moreover, each SVM is associated with one or more VIFs 219 and can span one or more physical nodes, each of which can hold one or more VIFs 219 and storage associated with one or more SVMs. Client systems can access the data on a SVM from any node of the clustered system, through the VIF(s) 219 associated with that SVM. In one aspect, a SVM manages the parent CG 160 and the child CGs 164, as described below in detail.

Each node 208.1-208.3 is a computing system to provide services to one or more of the client systems 204.1-204.N and host systems 102A-102N. The nodes 208.1-208.3 are interconnected by the switching fabric 210, which, for example, can be embodied as a Gigabit Ethernet switch or any other type of switching/connecting device.

Figure 2A:
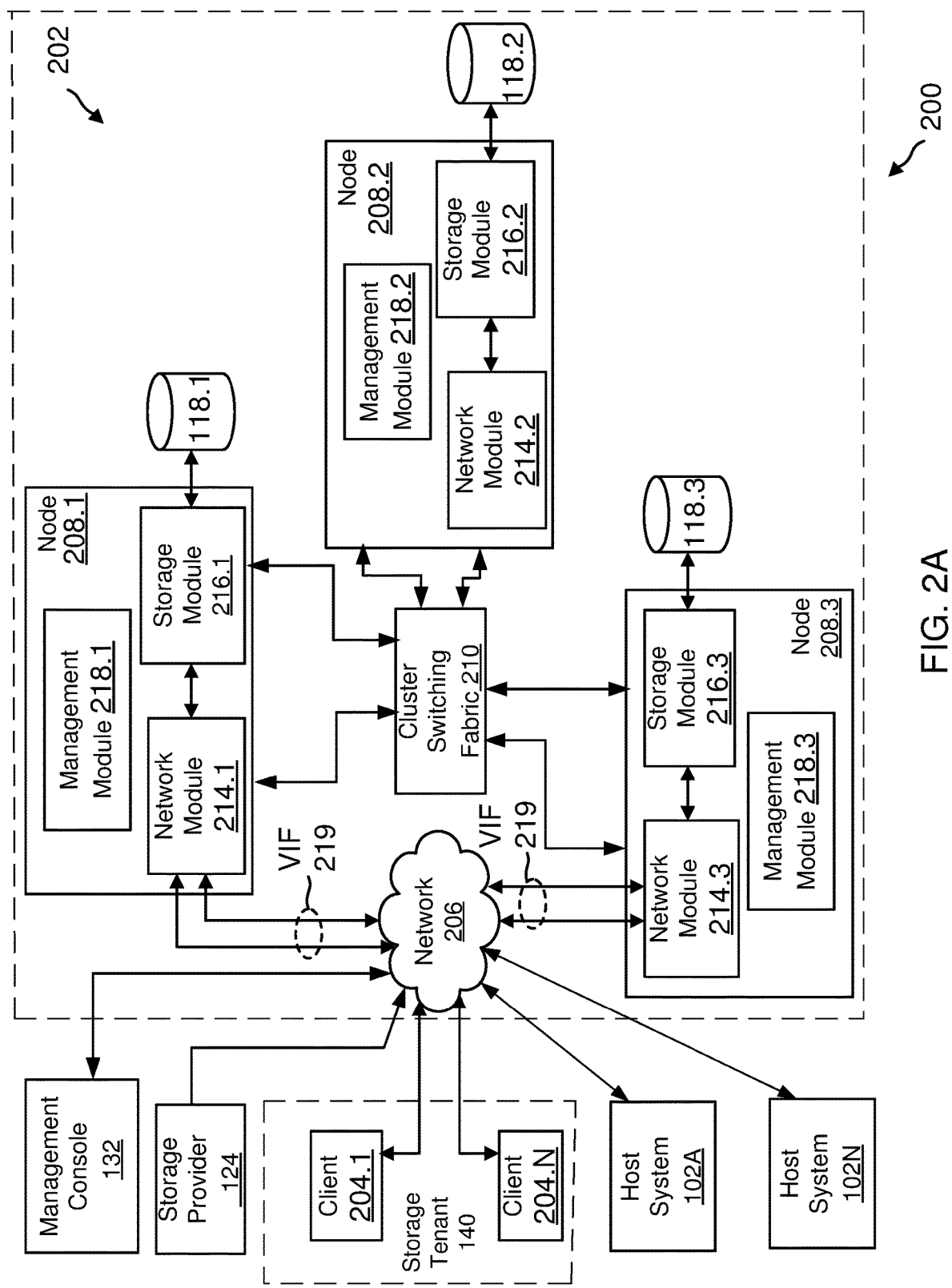
FIG. 2A shows an example of a clustered storage system with a plurality of storage system nodes, used according to aspects of the present disclosure.

Although FIG. 2A depicts an equal number (i.e., 3) of the network modules 214.1-214.3, the storage modules 216.1-216.3, and the management modules 218.1-218.3, any other suitable number of network modules, storage modules, and management modules may also be provided. There may also be different numbers of network modules, storage modules, and/or management modules within the clustered storage system 202. For example, in alternative aspects, the clustered storage system 202 may include a plurality of network modules and a plurality of storage modules interconnected in a configuration that does not reflect a one-to-one correspondence between the network modules and storage modules. In another aspect, the clustered storage system 202 may only include one network module and storage module.

Each client system 204.1-204.N may request the services of one of the respective nodes 208.1, 208.2, 208.3, and that node may return the results of the services requested by the client system by exchanging packets over the computer network 206, which can be wire-based, optical fiber, wireless, or any other suitable combination thereof.

Figure 2B:
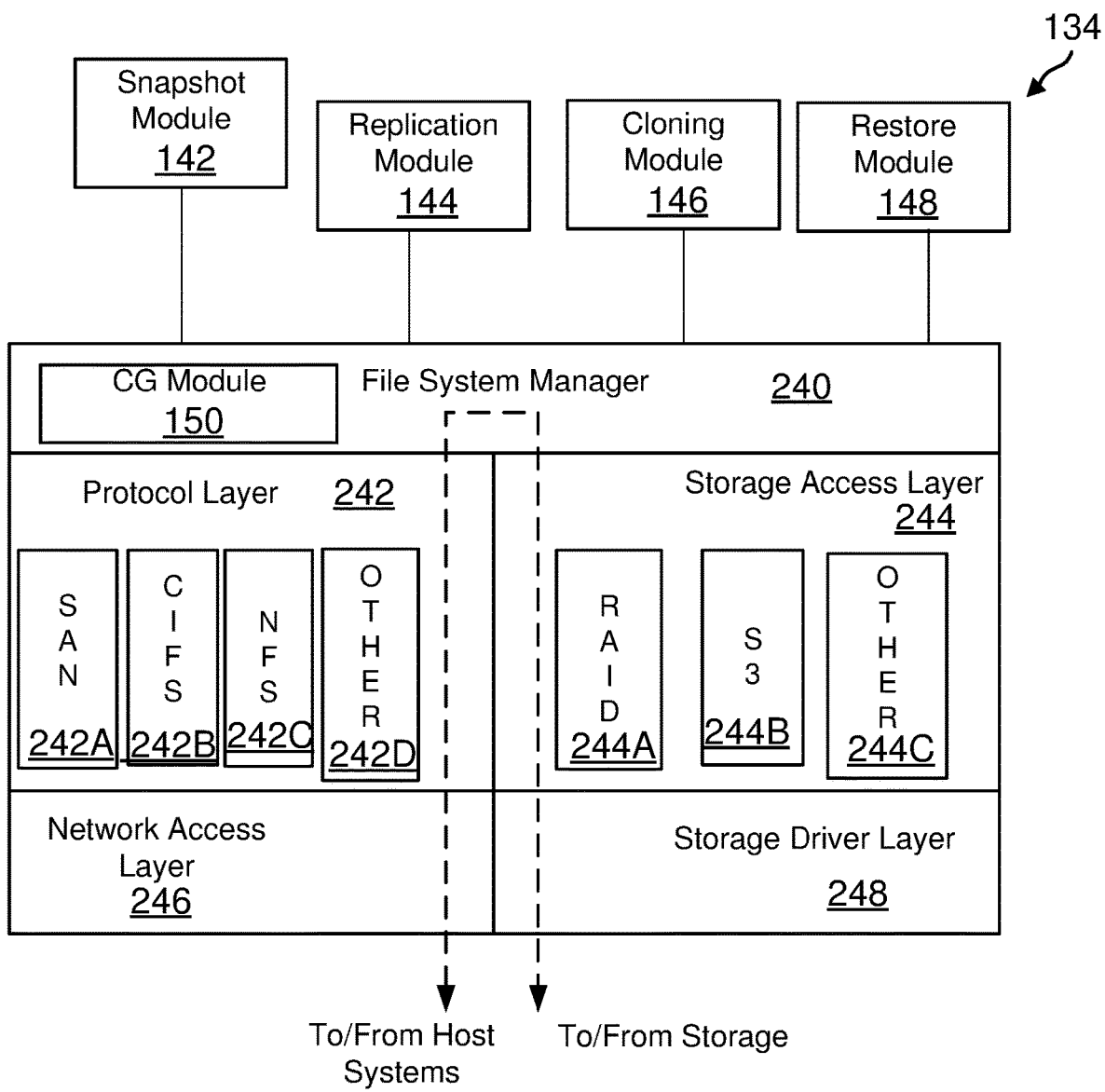
FIG. 2B shows an example of a storage operating system executed by a storage system node, according to aspects of the present disclosure.

Storage Operating System: FIG. 2B illustrates a generic example of the storage operating system 134 of FIG. 1A executed by the storage system 108 (or nodes 208.1-208.3, FIG. 2A), according to one aspect of the present disclosure. In one example, storage operating system 134 may include several modules, or "layers" executed by one or both of network module 214 and storage module 216. These layers include a file system manager 240 that manages read/write operation, i.e. executes read/write operation on storage in response to I/O requests. The file system manager 240 includes or interfaces with the CG module 150 to configure hierarchical CGs using model 149 of FIG. 1C. The configuration process is described below with respect to FIG. 3. The file system manager 240 includes or interfaces with the snapshot module 142 for taking snapshots, replication module 144 for replicating the parent CG 160 and the child CGs 164, cloning module 146 for cloning the parent CG 160 and the child CGs 164, restore module 148 for restoring the parent CG 160 and the child CGs 164 using model 149 (FIG. 1C), described below with respect to FIGS. 4A-4E.

Storage operating system 134 may also include a protocol layer 242 and an associated network access layer 246, to allow node 208.1 to communicate over a network with other systems, such as clients 204.1/204. N. Protocol layer 242 may implement one or more of various higher-level network protocols, such as SAN (e.g. iSCSI) (242A), CIFS (242B), NFS (242C), Hypertext Transfer Protocol (HTTP) (not shown), TCP/IP (not shown) and others (242D). The network access layer 246 may include one or more drivers, which implement one or more lower-level protocols to communicate over the network, such as Ethernet. Interactions between host systems and mass storage devices are illustrated schematically as a path, which illustrates the flow of data through storage operating system 134.

The storage operating system 134 may also include a storage access layer 244 and an associated storage driver layer 248 to allow storage module 216 to communicate with a storage device. The storage access layer 244 may implement a higher-level storage protocol, such as RAID (244A), a S3 layer 244B to access a capacity tier for object-based storage (not shown), and other layers 244C. The storage driver layer 248 may implement a lower-level storage device access protocol, such as Fibre Channel or SCSI. The storage driver layer 248 may maintain various data structures (not shown) for storing information regarding storage volume, aggregate and various storage devices.

As used herein, the term "storage operating system" generally refers to the computer-executable code operable on a computer to perform a storage function that manages data access and may, in the case of a storage system node, implement data access semantics of a general-purpose operating system. The storage operating system can also be implemented as a microkernel, an application program operating over a general-purpose operating system, such as UNIX® or Windows®, or as a general-purpose operating system with configurable functionality, which is configured for storage applications as described herein.

In addition, it will be understood to those skilled in the art that the disclosure described herein may apply to any type of special-purpose (e.g., file server, filer or storage serving appliance) or general-purpose computer, including a stand-alone computer or portion thereof, embodied as or including a storage system. Moreover, the teachings of this disclosure can be adapted to a variety of storage system architectures including, but not limited to, a network-attached storage environment, a storage area network and a storage device directly attached to a client or host computer. The term "storage system" should therefore be taken broadly to include such arrangements in addition to any subsystems configured to perform a storage function and associated with other equipment or systems. It should be noted that while this description is written in terms of a write any-where file system, the teachings of the present disclosure can be utilized with any suitable file system, including a write in place file system.

Figure 3:
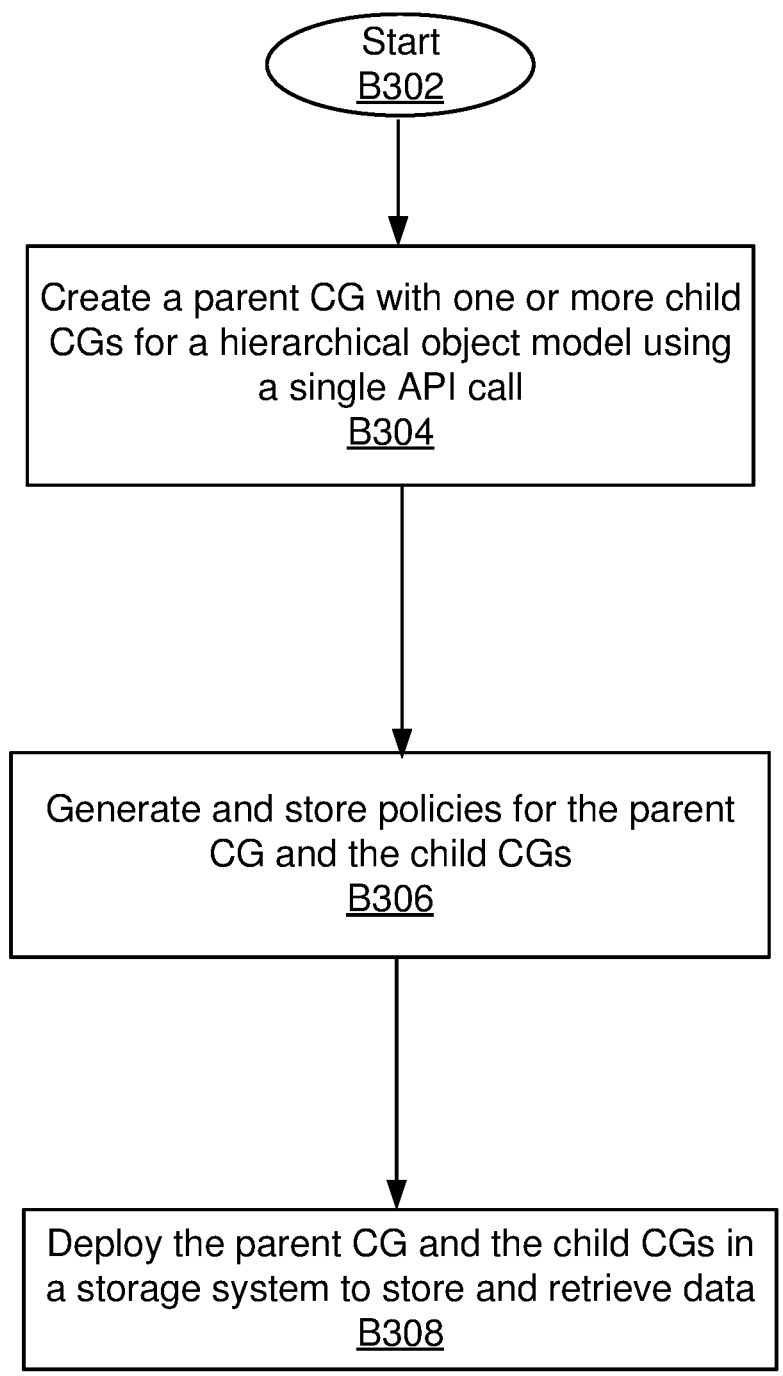
FIG. 3 shows an example of a process for configuring a hierarchical CG object model, according to aspects of the present disclosure.

Configuration Process: FIG. 3 shows a process 300 for configuring the parent CG 160 and the child CGs 164 of the object model 149 (FIG. 1C), according to one aspect of the present disclosure. The various blocks of process 300 are executed by one or more processors executing instructions from a memory. The process blocks are executed by the storage operating system 134 or any other component within system 100.

Process 300 begins in block B302, when instructions to create a hierarchical CG object are received by storage operating system 134. The instructions may be received directly from a user system or from another system, including the storage provider 124, the management console 132 or host 102. The adaptive aspects described herein are not limited to any specific component providing the instructions.

In block B304, the parent CG 160 with one or more child CGs 164 are created using a single API call. The parent CG 160 and the child CGs 164 are configured as logical structures within the hierarchy defined by the object model 149. For each child CG, one or more storage volumes are assigned. New storage volumes may be created for the child CGs or existing storage volumes are assigned to the child CGs. The storage volumes assigned to the child CGs are also associated with the parent CG. Furthermore, storage volumes can be moved from one child CG to another, without any disruption to the parent CG.

Figure 6:
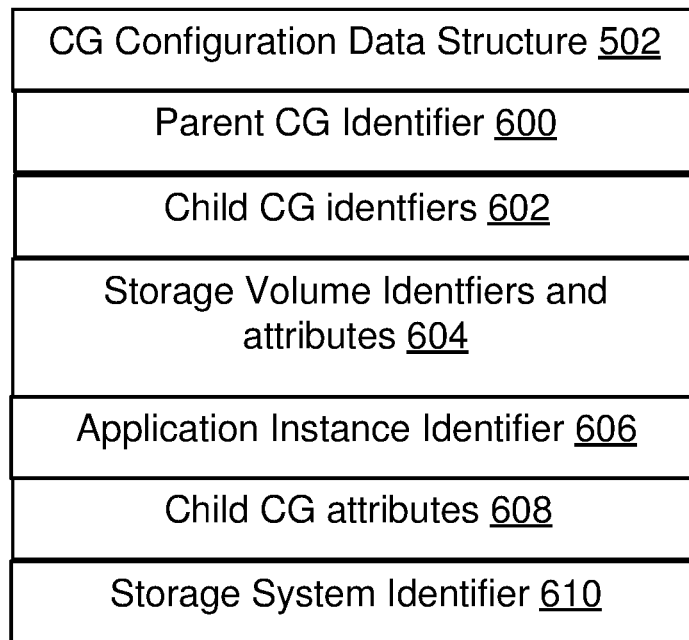
FIG. 6 shows an example of data structures for using a hierarchical CG object model, according to aspects of the present disclosure.
Figure 6:
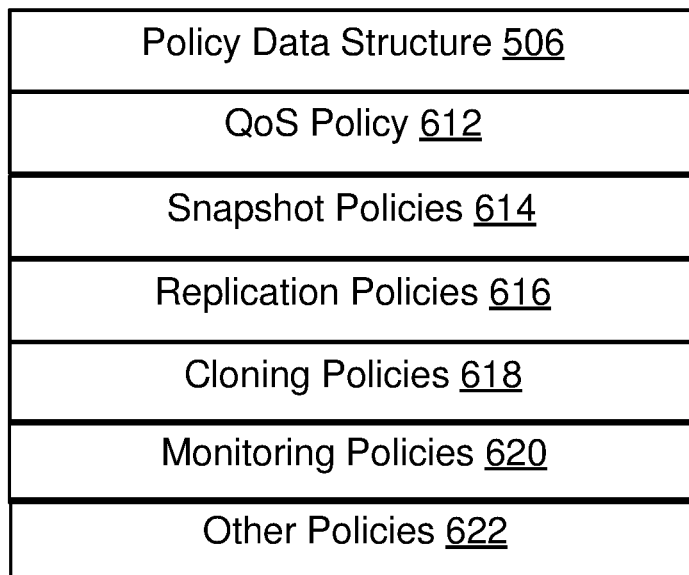

The configuration information regarding the CGs is stored in the CG configuration data structure 502 (see FIG. 6). The configuration data structure 502 stores a unique identifier of each CG (600/602), an attribute indicating a relationship between the parent and child CGs (608), a storage system identifier (610) identifying the storage system (or a SVM) that manages/owns the CGs, an application identifier (606) that identifies an application instance or a suite of applications associated with the parent CG, an application identifier associated with a child CG, and an attribute (608) indicating the type of information stored using the child CGs, e.g., for a database application, the attribute indicates if a child CG stores data or logs; or any other information. The configuration data structure 502 identifies the storage volumes of each child CG, a path to enable access to the storage volume, indicates a size of the storage volume and a storage volume type (e.g. whether the storage volume is a "FlexVol" whose capacity can be changed based on usage), indicates an attribute of the storage volume, e.g., indicating whether a storage volume is a data volume or a log volume.

Figure 5:
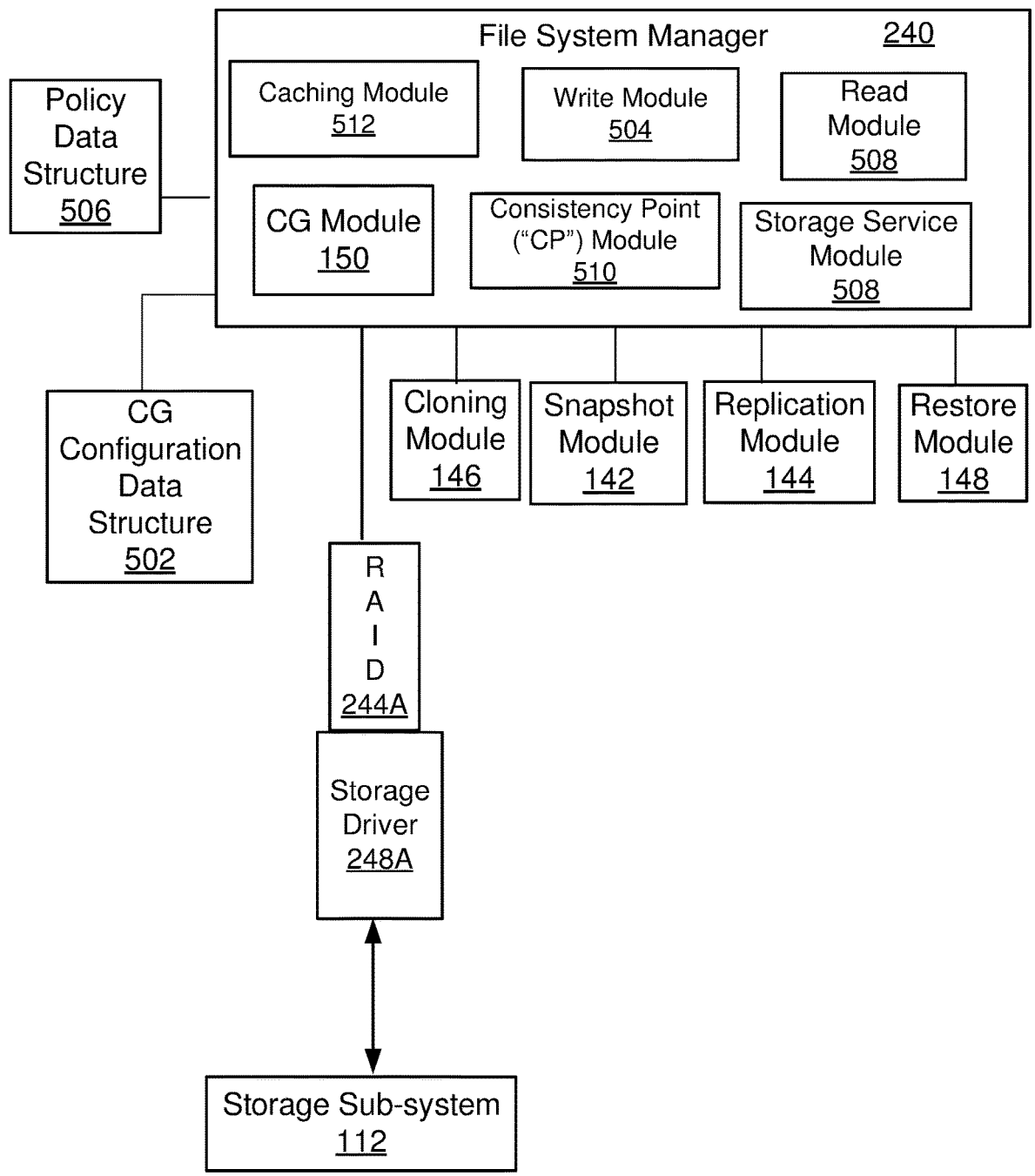
FIG. 5 shows a block diagram of a file system manager of a storage operating system, according to aspects of the present disclosure.

In block B306, policies associated with the parent CG 160 and the child CGs 164 are generated. The policies are stored in a policy data structure 506 (FIG. 5). The policy data structure 506 identifies the parent CG and the child CGs. The policy data structure 506 identifies a QoS policy (612, FIG. 6), a snapshot policy (614), cloning policy (618), replication policy (616), a monitoring policy (620) and other policies (622). The QoS policy established at the parent CG level flows to the child CGs, and vice-versa. Furthermore, the QoS parameters, including IOPS and data throughput can be shared between the child CGs. The child CGs may have different snapshot schedules. The snapshot policy 614 may also define a sequence i.e. an order in which snapshots of the child CGs are taken, and/or the volumes within the child CGs. The monitoring policy 620 identifies the parent CG 160 and the child CGs 164 and the parameters to monitor the performance of the storage volumes in the object model. 149. The parameters include latency, IOPS, data throughput or any other parameter. The management console 132 interfaces with the storage operation system 134 to monitor these parameters and initiates a corrective action, when a performance parameter does not meet a set policy. For example, if a volume has a latency that has reached a threshold value, the storage operating system 134 may trigger load balancing of just that volume or all the volumes of the associated CG as appropriate to reduce the latency below the threshold value.

In block B308, the parent CG 160 and the child CGs 164A-164N are deployed in the storage system 108 (or 202, FIG. 2A) to store and retrieve data for one or more applications.

Figure 4A:
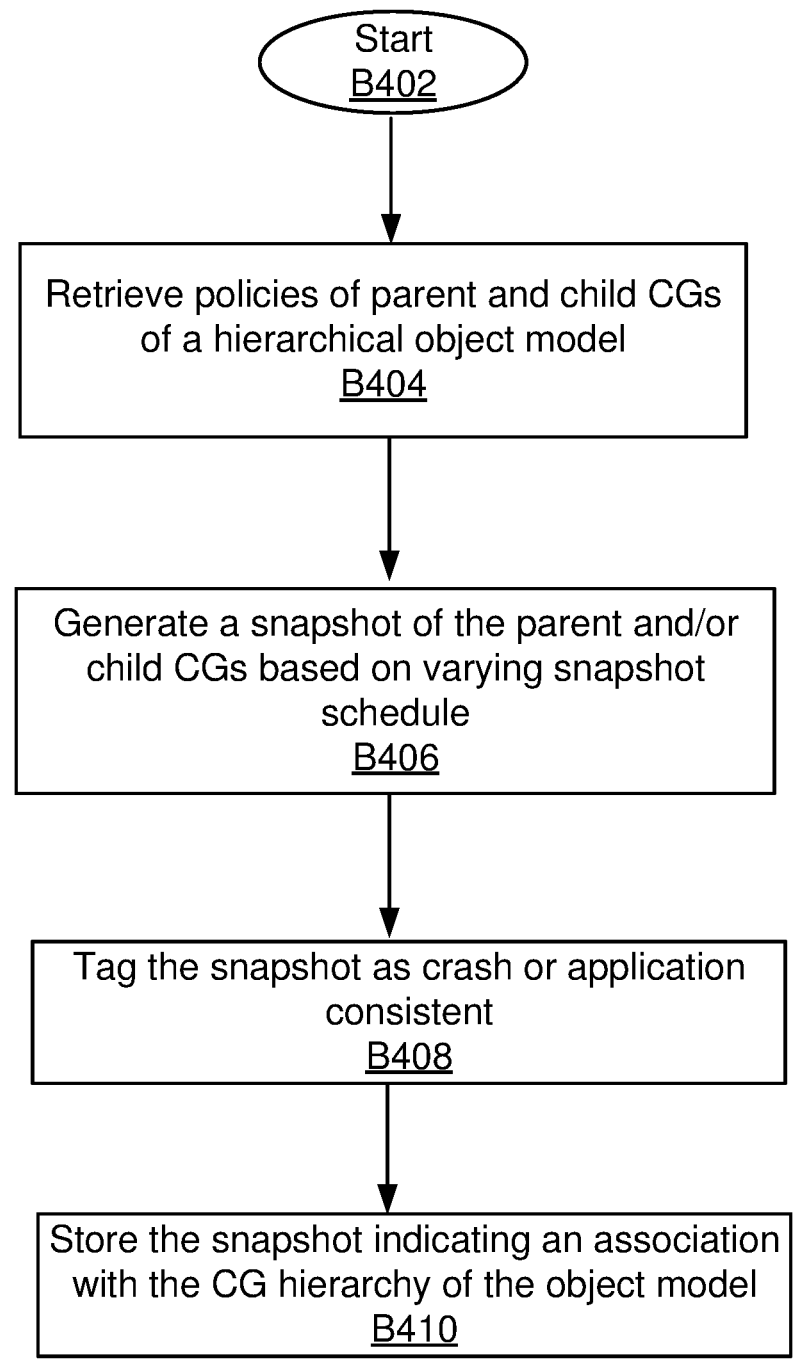
FIG. 4A shows an example of a process for taking a backup using a hierarchical CG object model, according to aspects of the present disclosure.

Snapshot Process: FIG. 4A shows a process 400 for generating a snapshot of the CGs of the object model 149, according to one aspect of the present disclosure. The process blocks are executed by the snapshot module 142.

Process 400 begins in block B402, when the object model 149 with parent CG 160 and the child CGs 164 have been configured and deployed to store data at the storage volumes of each child CG.

In block B404, the snapshot module 142 retrieves the snapshot policies (e.g., 614, FIG. 6) associated with the parent CG 160 and the child CGs 164 from the policy data structure 506. In block B406, a snapshot is taken of the parent CG 160 and/or the child CGs 164A1064N, based on the policies. The snapshots are based on a schedule defined by the retrieved policies. In one aspect, one child CG may have a different schedule than the other child CG. Furthermore, the snapshots of different child CGs is executed in a specific sequence that is provided by the snapshot policy. The snapshot is tagged as being crash consistent or application consistent in block B408. An application consistent snapshot is taken after current operations for an application are paused (quiesced) and any data in a memory of a storage server is flushed to storage devices 118. Crash consistent snapshots are taken at a given time and captures all the data in storage devices 118 but may not include some data that maybe in transit, e.g. data stored at the memory of the storage server 108.

In block B410, the snapshot is stored with snapshot metadata. The snapshot metadata includes a snapshot identifier, a snapshot size, a volume identifier that identifies a snapshot volume, an attribute that links the snapshot to the object model 149, namely, the parent CG 160 and when applicable, a child CG 164. The snapshot can be used to restore both the parent CG 160 and the child CGs 164 by the restore module 148, using a single restore API call. Linking the attribute to the object model 149 is advantageous for determining member volumes that are included in a snapshot for a restore operation. For example, assume that a child CG has two volumes V1 and V2 and a snapshot S1 is taken with V1 and V2. Later, a volume V3 is added to the child CG. When a restore operation based on snapshot S1 is to be executed, the user is aware that the restore operation will only include V1 and V2 and not V3.

Figure 4B:
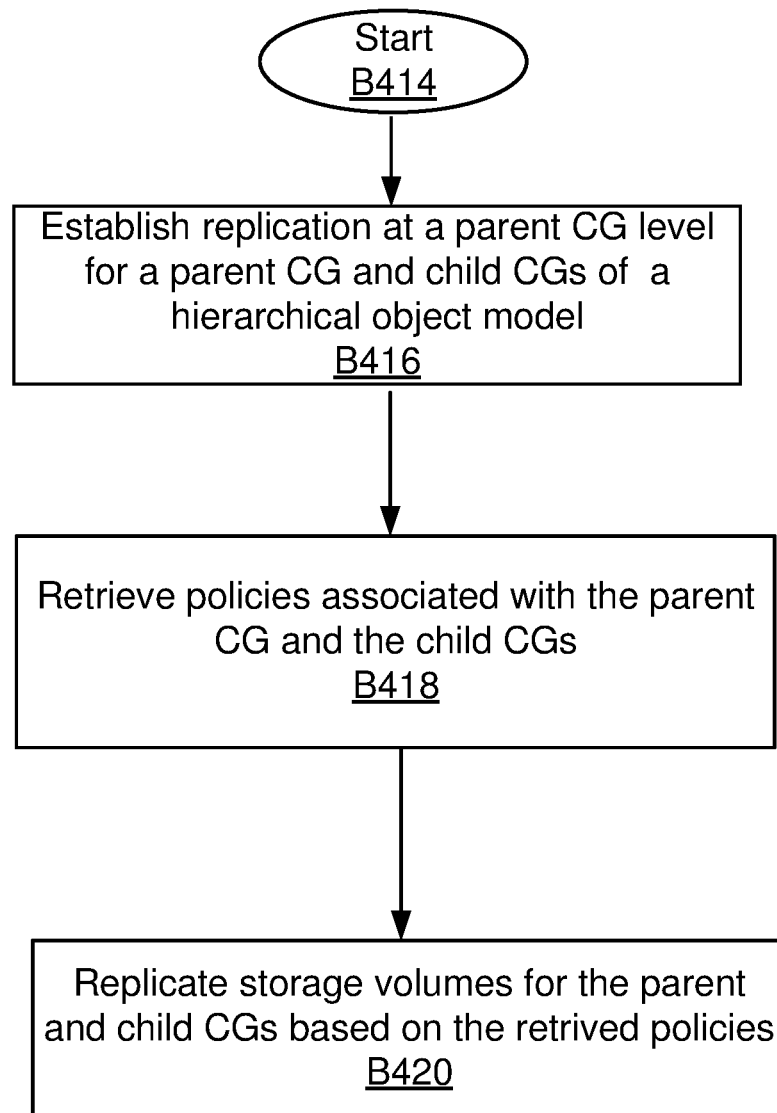
FIG. 4B shows an example of a replication process using a hierarchical CG object model, according to aspects of the present disclosure.

Replication Process: FIG. 4B shows a process 412 for replicating the parent CG 160 and the child CGs 164 of the object model 149, according to one aspect of the present disclosure. The term replication as used herein means replicating a primary storage volume of a primary storage system of a first cluster to a secondary storage volume at a secondary storage system, for example, in a second cluster or within the first cluster. The replication can be synchronous i.e. when data is written at the primary volume, it is replicated by the replication module 144 immediately to the secondary volume. Replication can also be asynchronous i.e. after data is written to the primary volume, it is replicated to the secondary volume at a later time.

Process 412 begins in block B414, after the object model 149 with the parent CG 160 and child CGs 164 have been deployed by the storage operating system 134. In block B416, replication relationship is established at the parent CG 160 level between a primary storage system and a secondary storage system. This means that the replication policies and settings flow down from the parent CG 160 to the child CGs 164. In one aspect, the replication policies indicate the type of replication for the child CGs 164 and the replication schedules. For example, some child CGs are replicated asynchronously, while others are replicated synchronously. This choice can be based on the type of data stored at the primary storage volume. For example, data volumes of a database can be replicated asynchronously, while log volumes can be replicated synchronously. Furthermore, the replication schedules can also vary for different child CGs, depending on the type of data stored at the storage volumes of each child CG. This enables the storage system to better use network bandwidth.

In block B418, the replication policy 616 is retrieved for the parent CG 160 and in block B420, the storage volumes for the parent and child CGs are replicated based on the set policy. As described above, this may include executing synchronous or asynchronous replication by the replication module 144, and/or executing replication at different times.

Figure 4C:
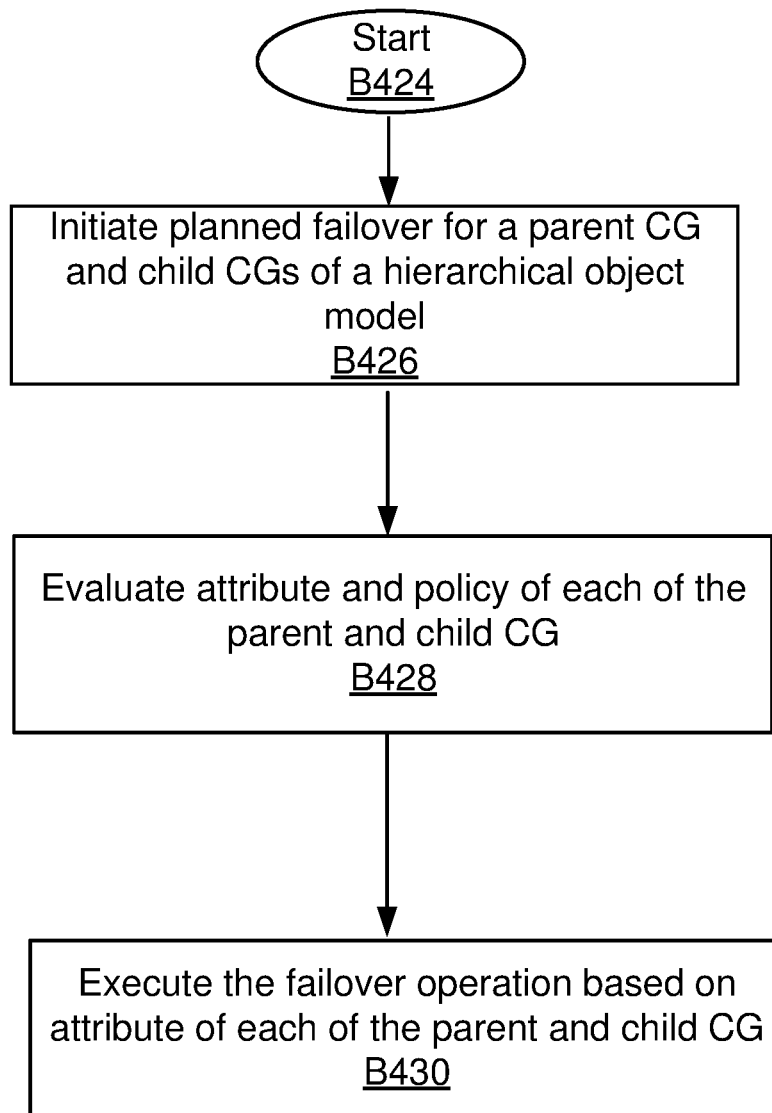
FIG. 4C shows an example of a planned failover process using a hierarchical CG object model, according to aspects of the present disclosure.

Planned Failover: In one aspect, two storage systems (or nodes, e.g., 208.1 and 208.2, FIG. 2) within the same cluster or in different clusters are configured as high-availability, partner nodes. This means that if a node fails or is likely to fail, the partner node takes over the storage of the failed node (or likely to fail node). The failover process is managed by the storage operating system 134 at each node. The failover process can be planned or unplanned. FIG. 4C shows a process 422 for executing a planned failover operation, according to one aspect of a present disclosure.

Process 422 begins in block B424, after the object model 149 with the parent CG 160 and child CGs 164 have been configured and operational to store data for one or more applications. The data is stored at a primary storage system and mirrored at a partner, secondary storage system. The planned failover operation is initiated in block B426 by the storage system 134, when the primary storage system (or e.g., node 208.1, FIG. 2A) is taken offline and a partner, secondary storage system (e.g., node 208.2, FIG. 2A) takes over the storage managed and presented by the primary storage system.

In block B428, the attribute and policy of each CG in the object model 149 is evaluated. This ensures that the storage operating system 134 is aware of any sequencing requirements between the child CGs 164.

In block B430, a failover operation is executed to make the parent CG 160 and the child CGs 164 available from the secondary storage system. In conventional systems, individual snapshots of each CG have to be restored as part of a failover operation. The object model 149 enables a faster failover operation because the storage operating system 134 makes the parent CG 160 and the child CGs 164 available at the same time without having to perform individual failover operations for each child CG. A single operation makes the parent CG 160 and the child CGs 164 available from the secondary storage system.

Figure 4D:
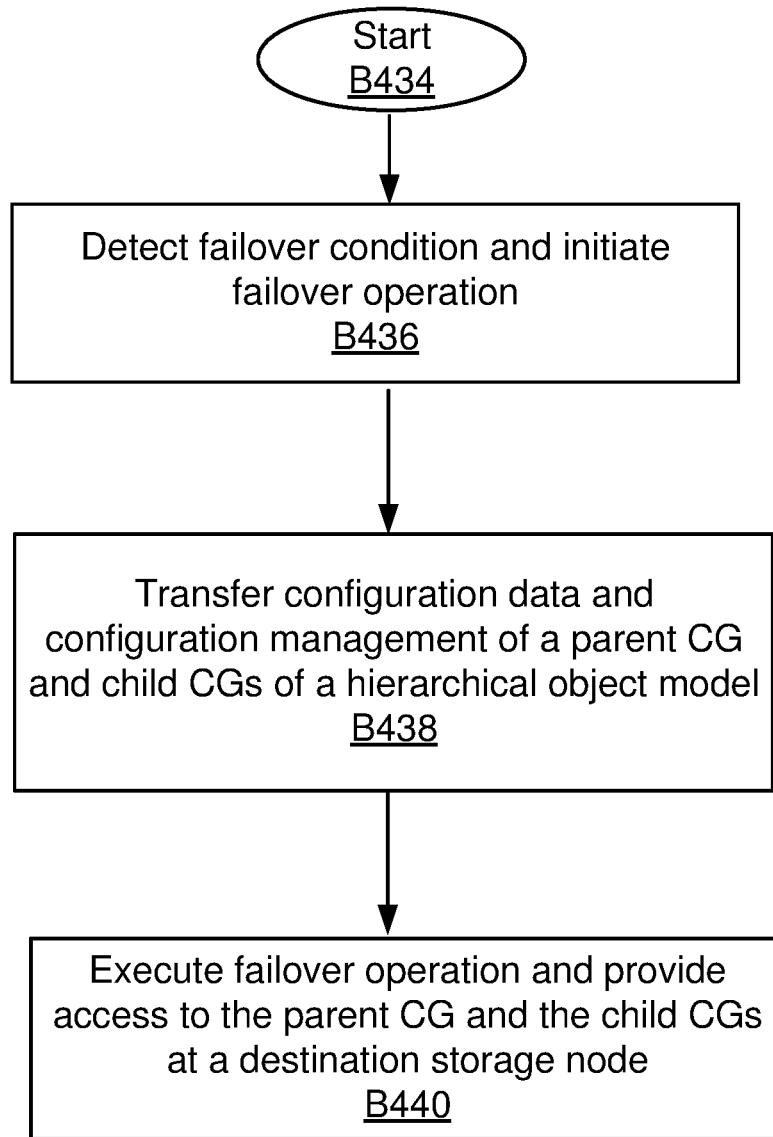
FIG. 4D shows an example of an unplanned failover process using a hierarchical CG object model, according to aspects of the present disclosure.
Figure 4D:

Unplanned Failover: FIG. 4D shows a process 432 for an unplanned failover operation. Process 432 begins in block B434, after the object model 149 with the parent CG 160 and the child CGs 164 have been configured and are operational to store data for one or more applications. The data is stored at a primary storage system (e.g., node 208.1) and mirrored at a partner, secondary storage system (e.g. node 208.2).

In block B436, a failover condition is detected. The failover condition prevents or may prevent the primary storage system to present storage for the parent CG 160 and/or the child CGs 164. The condition may include lack of network bandwidth within system 100/200, storage space utilization at the primary storage system exceeds or may exceed a threshold level, and/or a service level objective may not be met by the primary storage system including latency, IOPS or any other parameter. The adaptive aspects described herein are not limited to any specific condition or parameter that triggers an unplanned failover.

In block B438, the configuration data structure 502 associated with object model 149 is made available to the secondary storage system. It is noteworthy that the configuration management of the object model 149 is also made available at the secondary storage system. This enables a user to update any configuration parameter associated with the parent CG 160 or child CGs 164 at the secondary storage system.

In block B440, the failover operation is executed and access to the parent CG 160 and the child CGs 164 is made available from the secondary storage system.

Figure 4E:
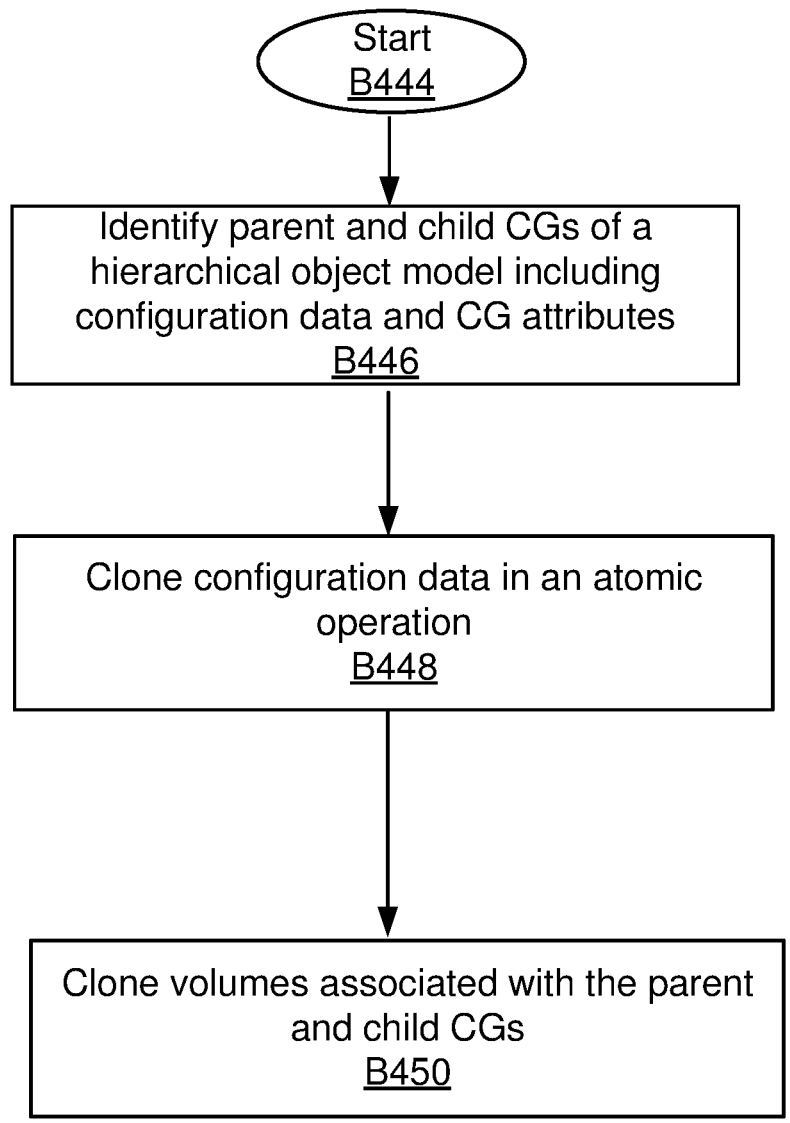
FIG. 4E shows an example of a cloning process using a hierarchical CG object model, according to aspects of the present disclosure.
Figure 4E:

Cloning Process: FIG. 4E shows a cloning process 442 to clone at the parent CG level of object model 149, according to one aspect of the present disclosure. The term clone as used herein means a logical object that is a clone of a storage snapshot. The clone points to the same data blocks that store the snapshot and does not require copying of all snapshot files. In one aspect, all the storage objects including the policy data structure 506 and the configuration data structure 502 are cloned with the storage volumes of the parent CG 160 and the child CGs 164. In one aspect, the cloning sequence specified by the policy data structure 506 is followed, e.g., a first child CG is cloned before another child CG.

Process 442 begins in block B444, after the object model 149 with the parent CG 160 and child CGs 164 have been configured and generated. A snapshot of the parent CG 160, the child CGs 164 and the configuration data structure 502 and policy data structure 506 has been taken using the process of FIG. 4A. It is noteworthy that either a new snapshot of the parent CG 160 and the child CGs 164 can be taken for the cloning operation or an existing snapshot is used.

To clone at the parent CG level, in block B446, the cloning module 146 identifies the parent CG 160 and the child CGs 164. The cloning module 146 also retrieves the cloning policy and configuration data structures 502. The cloning policy and attributes associated with the parent CG 160 and the child CGS 164 are examined by the cloning module 146 to determine if there are any sequencing requirements for the child CGs 164. Thereafter, in block B448, the configuration for the parent CG 160 and the child CGs 164 are cloned in an atomic operation. This reduces the time and processing it may take to clone configuration data of each individual CG separately in separate cloning operations. This saves computing resources of the storage system 108.

In block B450, the volumes associated with the parent CG 160 and the child CGs 164 are cloned from a snapshot. The cloning may be executed in a sequence based on a configured policy. The cloning operation is executed at the parent CG level, vis-à-vis cloning individual CGs, as performed by conventional systems. In one aspect, the cloning operation only clones the configuration data i.e. the parent CG 160 configuration is used as a template.

Figure 4F:
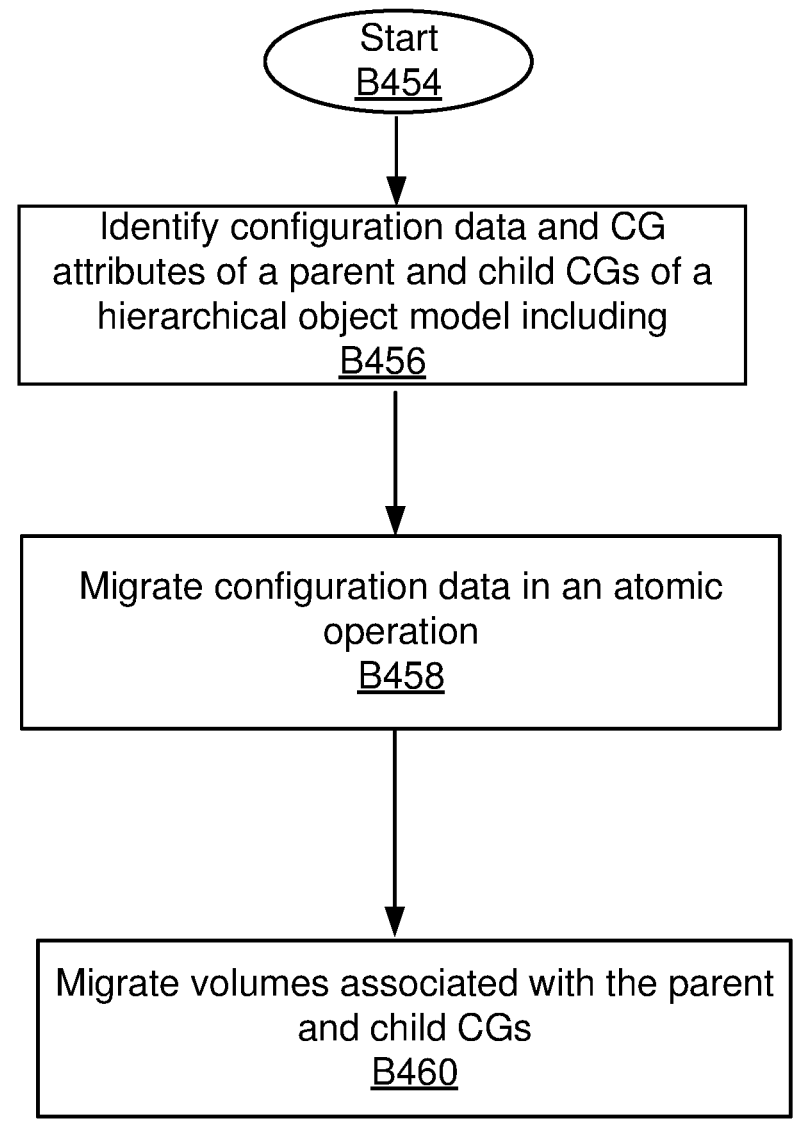
FIG. 4F shows an example of a migration process for migrating a hierarchical CG, according to aspects of the present disclosure.

Migration Process: FIG. 4F shows a process 452 for migrating the parent CG 160 and the child CGs 164 from a first storage system (or node, e.g., 208.1) to a second storage system (or node, e.g., 208.2), according to one aspect of the present disclosure. Process 452 begins in block B454, after the parent CG 160 and the child CGs 164 have been configured at the first node 208.1 and are operational.

In block B456, the configuration data and attributes of the parent CG 160 and the child CGs 164 are identified. In one aspect, this information is obtained from configuration data structure 502 and the policy data structure 506. The configuration information is migrated from the first node 208.1 to the second node 208.2 in an atomic operation in block B458. In block B460, the volumes associated with the parent CG 160 and the child CGs 164 are migrated to the second node 208.1. Since the configuration was migrated in a single operation, a cutover phase for the migration is not needed. The cutover phase in conventional migration technology involves executing cutover operations to ensure that all configuration information has been transferred for multiple CGs. This is needed in conventional technology because each CG configuration data is transferred using multiple operations compared to the atomic operation of block B458.

In one aspect, a method executed by one or more processors is provided. The method includes: generating an object model for representing a hierarchical consistency group (CG) (e.g., 149, FIG. 1C) with a parent CG (e.g., 160) associated with at least a first child CG (e.g., 164A) having a plurality of storage volumes; utilizing an atomic application programming interface (API) (e.g., 174) to provision the parent CG and the first child CG by allocating storage, and to store a first policy (e.g. 162A) for the parent CG, and a second policy (e.g., 166A) for the first CG, the first policy and the second policy defining an attribute, a snapshot schedule, and a replication schedule for each of the parent CG and the first CG, the attribute indicating a difference between the first CG and the parent CG; initializing the parent CG and the first CG; and providing a storage service selected from a backup service (FIG. 4A), a replication service (FIG. 4B) and a cloning service (FIG. 4C) for the parent CG and the first CG, based on the first policy and the second policy.

In another aspect, the method further includes associating the parent CG with a second child CG (e.g., 164B) having a plurality of storage volumes, the second child CG associated with a third policy (e.g., 166B); utilizing a first schedule to execute a backup operation to generate a snapshot of the parent CG; utilizing a second schedule to execute a backup operation to generate a snapshot of the first child CG; and utilizing a third schedule to execute a backup operation to generate a snapshot of the second child CG; the first, second and third schedule being different from each other.

In yet another aspect, the method also includes sequencing the backup of the first child CG and the second child CG such that the first child CG backup occurs before the second child CG.

In another aspect, the method further includes replicating the first child CG using asynchronous replication and the second child CG using synchronous replication.

In yet another aspect, the method also includes executing a failover operation (FIG. 4C/4D) to recover the parent CG, the first child CG and the second child CG at a destination device, upon detecting a failure associated with the parent CG, the first child CG or the second child CG at a source device hosting the parent CG, the first child CG and the second child CG.

In another aspect, the method further includes generating a clone of the parent CG, the first child CG and the second child CG in a sequence specified by an attribute of the parent CG.

File System Manager 240: FIG. 5 shows a block diagram of the file system manager 240 (first introduced with respect to FIG. 2B), according to one aspect of the present disclosure. The file system manager 240 includes or interfaces with the CG module 150 that maintains the configuration data structure 502 and the policy data structure 506 for the parent CG 160 and the child CGs 164 of the object model 149 (FIG. 1C). The data structures 502 may be implemented as a single data structure. Details of data structures 502 and 506 are provided below with respect to FIG. 6. The file system manager 240 also interfaces with or include the snapshot module 142, the replication module 144, the cloning module 146 and the restore module 148 described above in detail.

The file system manager 240 includes a write module 504 that manages write requests for writing data in storage device 118 (FIG. 1A/2A), and a read module 508 that manages read requests for reading data from storage devices 118. The write module 504 may include a write allocator sub-module (not shown) that allocates storage space for storing data.

A caching module 512 manages a buffer cache (not shown) to load a buffer tree. A consistency CP) module 510 is used to manage CP operations to flush data from the buffer cache to persistent storage (e.g. storage devices 118). In one aspect, when data is to be persistently stored, the data is marked as dirty at the buffer cache, and then the CP module 510 flushes the dirty data from the buffer cache 140 to the storage subsystem 112 e.g. at storage devices 118.

The read module 508 is used to fetch data from the storage devices 118 at the storage subsystem 112 in response to read requests. The RAID layer 244A uses a storage driver 248A, for example a Fibre Channel driver, to access the storage devices 1.18 at the storage subsystem 112 to retrieve the requested data and present the data to an application that requested the data.

Data Structures: FIG. 6 shows an example of data structures 502 and 506, according to one aspect of the present disclosure. In one aspect, the data structures 502 and 506 are stored at a memory of a storage system node (e.g., 704, FIG. 7), local storage (e.g., 718) or any other location.

The configuration data structure 502 uniquely identifies each parent CG by an identifier (600). Each child CG 164 is identified by identifiers 602. The storage volumes associated with each child CG 164 and the parent CG 160 are identified using identifier 604. An application instance associated with the parent CG 160 are identified by the application instance identifier 606. It is noteworthy that the identifiers 606 can identify an application suite and identify an application instance that is associated with a child CG. This means that the application instance uses one or more child CGs to store its data.

The child CG attributes 608 of the configuration data structure 502 indicates the parent child relationship within object model 149, a property of the volumes associated with the child CGs (e.g., whether the volumes are data or log volumes) or any other attribute. A storage system that manages the parent CG 160 and the child CG 164 is identified by the storage system identifier 610 of the configuration data structure 502.

The data structure 502 includes the QoS policy 612 that defines QoS parameters controlled and managed by the storage system 108. This may include latency, IOPS, throughput or any other parameters. As mentioned above, the QoS Policy 612 assigned to the parent CG 160 flows to the child CGs 164.

The policy data structure 502 includes the snapshot policies 614 for the parent CG 160 and the child CGs 164. The snapshot policies 614 include snapshot schedules, snapshot types (application or crash consistent), sequence information indicating that the snapshots are to be taken sequentially, or any other information.

The policy data structure 502 includes the replication policies 616 for the parent CG 160 and the child CGs 164 indicating a relationship between a primary and secondary storage system, a replication type (e.g., synchronous or asynchronous), replication sequence or any other information.

The policy data structure 502 includes the cloning policies 618 for the parent CG 160 and the child CGs 164 indicating a sequence for taking clones, type of snapshot used for cloning, volume that need to be cloned, clone life cycle management information indicating a duration for keeping the clones or any other information.

The policy data structure includes the monitoring policies 620 that identifies the parent CG 160 and the child CGs 164 and parameters to monitor the performance of the storage volumes in the object model 149, e.g., latency, IOPS, throughput or any other parameter.

The policy data structure 502 includes other policies 622.

Figure 7:
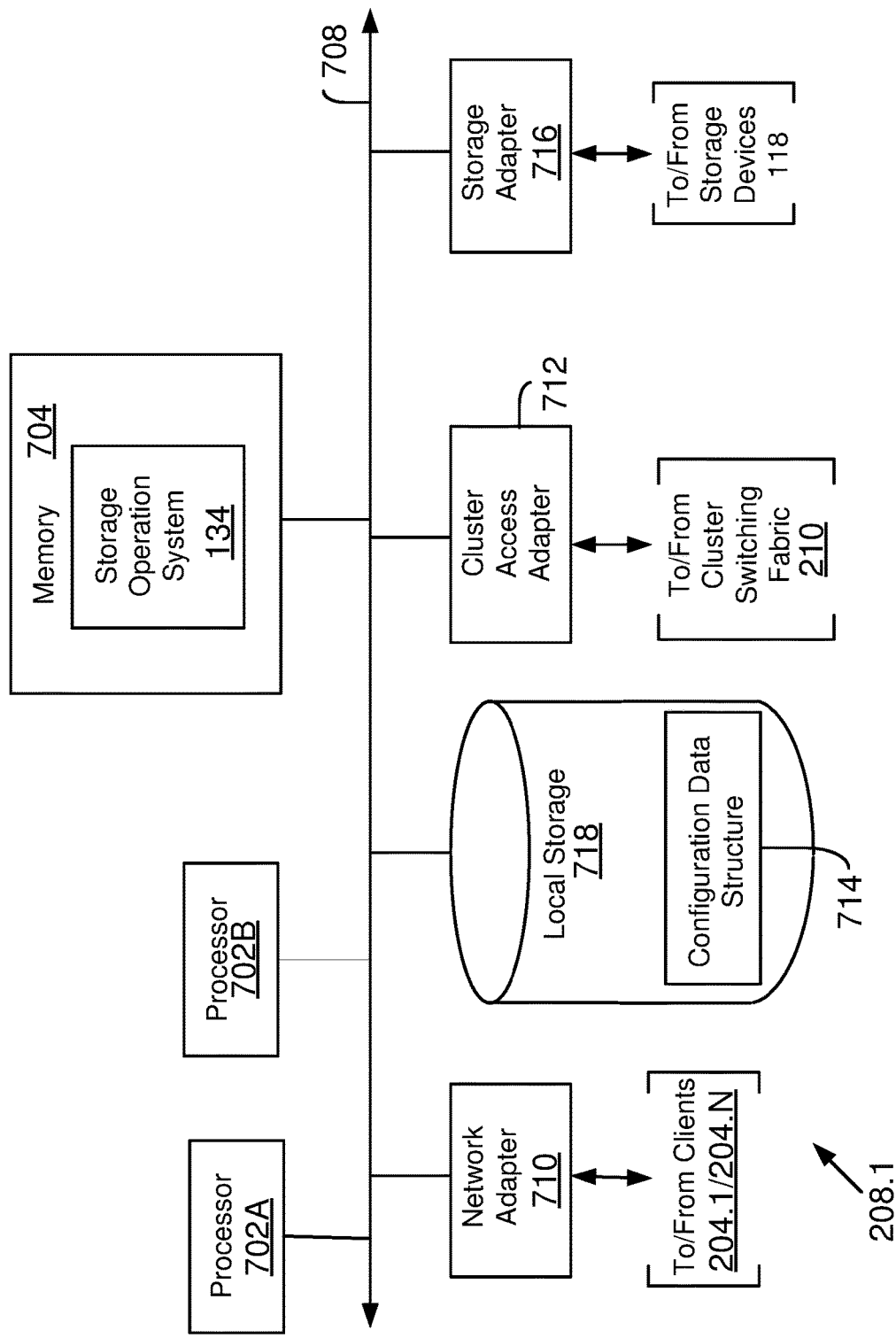
FIG. 7 shows an example of a storage system node, used according to aspects of the present disclosure.

Storage System Node: FIG. 7 is a block diagram of a node 208.1, (including the storage system node 108) for implementing the object model 149, illustratively embodied as a storage system comprising of a plurality of processors 702A and 702B, a memory 704, a network adapter 710, a cluster access adapter 712, a storage adapter 716 and local storage 718 interconnected by a system bus 708. As an example, processors 702A-702B may include, one or more programmable general-purpose or special-purpose microprocessors, digital signal processors (DSPs), programmable controllers, application specific integrated circuits (ASICs), programmable logic devices (PLDs), or the like, or a combination of such hardware devices.

The local storage 718 comprises one or more storage devices utilized by the node to locally store configuration information for example, in a configuration data structure 714 that may include data structures 502 and 506.

The cluster access adapter 712 comprises a plurality of ports adapted to couple node 208.1 to other nodes of cluster 202 (FIG. 2A). In the illustrative aspect, Ethernet can be used as the clustering protocol and interconnect media, although it will be apparent to those skilled in the art that other types of protocols and interconnects can be utilized within the cluster architecture described herein. In alternate aspects where the network modules and storage modules are implemented on separate storage systems or computers, the cluster access adapter 712 is utilized by the network/storage module for communicating with other network/storage-modules in the cluster 202.

Each node 208.1 is illustratively embodied as a dual processor storage system executing the storage operating system 134 that preferably implements a high-level module, such as a file system manager 240, to logically organize the information as a hierarchical structure of named directories and files at storage 118. However, it will be apparent to those of ordinary skill in the art that the node 208.1 may alternatively comprise a single or more than two processor systems. Illustratively, one processor 702A executes the functions of the network module on the node, while the other processor 702B executes the functions of the storage module.

The memory 704 illustratively comprises storage locations that are addressable by the processors and adapters for storing programmable instructions and data structures 502 and 506. The processor and adapters may, in turn, comprise processing elements and/or logic circuitry configured to execute the programmable instructions and manipulate the data structures. It will be apparent to those skilled in the art that other processing and memory means, including various computer readable media, can be used for storing and executing program instructions pertaining to the disclosure described herein.

The storage operating system 134 portions of which is typically resident in memory and executed by the processing elements, functionally organizes the node 208.1 by, inter alia, invoking storage operation in support of the storage service implemented by the node.

The network adapter 710 comprises a plurality of ports adapted to couple the node 208.1 to one or more clients 204.1/204.N over point-to-point links, wide area networks, virtual private networks implemented over a public network (Internet) or a shared local area network. The network adapter 710 thus may comprise the mechanical, electrical and signaling circuitry needed to connect the node to the network. Each client 204.1/204.N may communicate with the node over network 206 (FIG. 2A) by exchanging discrete frames or packets of data according to pre-defined protocols, such as TCP/IP.

The storage adapter 716 cooperates with the storage operating system 134 executing on the node 208.1 to access information requested by the clients. The information can be stored on any type of attached array of writable storage device media such as hard drives, solid state drives, storage class memory, video tape, optical, DVD, magnetic tape, bubble memory, electronic random access memory, micro-electro mechanical and any other storage media adapted to store information, including data and parity information. However, as illustratively described herein, the information is preferably stored at storage device 118. The storage adapter 716 comprises a plurality of ports having input/output (I/O) interface circuitry that couples to the storage devices over an I/O interconnect arrangement, such as a conventional high-performance, Fibre Channel link topology. In one aspect, if an error prevents the storage adapter 716 to access storage device 118, then the node 208.1 may become unresponsive and trigger a takeover operation.

Figure 8:
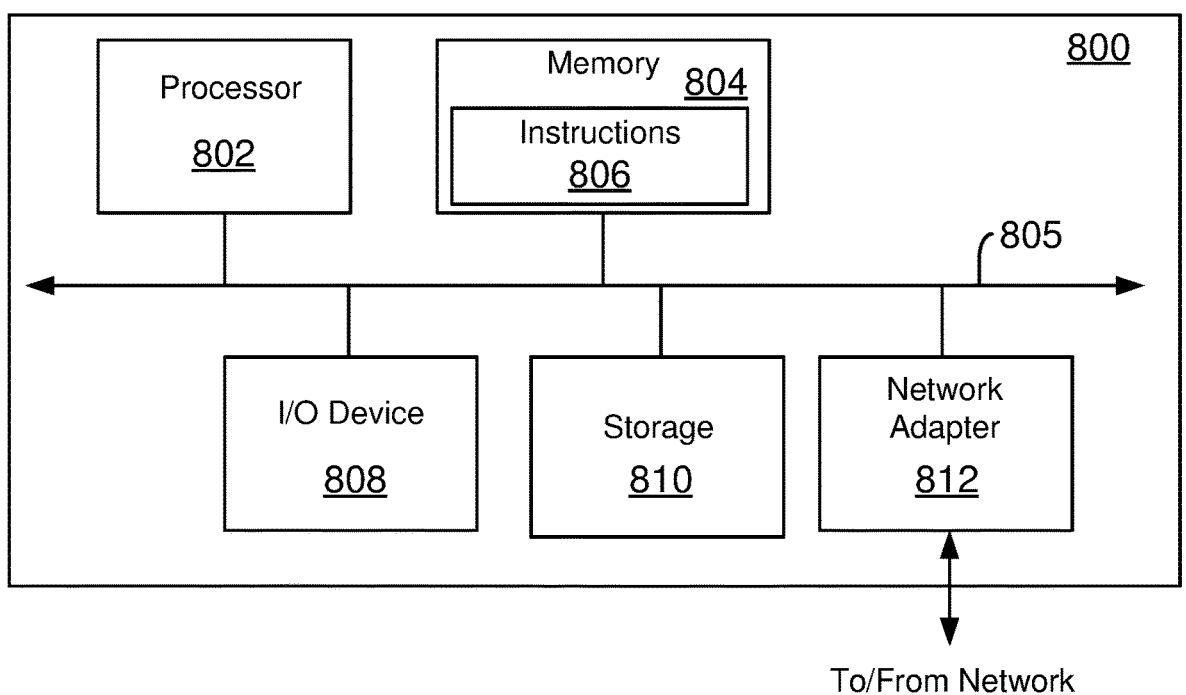
FIG. 8 shows an example of a processing system, used according to aspects of the present disclosure.

Processing System: FIG. 8 is a high-level block diagram showing an example of the architecture of a processing system 800 that can be used according to one aspect of the present disclosure. The processing system 800 can represent the storage system 108, host system 102, management console 132, or clients 116, 204. Note that certain standard and well-known components which are not germane to the present aspects are not shown in FIG. 8.

The processing system 800 includes one or more processor(s) 802 and memory 804, coupled to a bus system 805. The bus system 805 shown in FIG. 8 is an abstraction that represents any one or more separate physical buses and/or point-to-point connections, connected by appropriate bridges, adapters and/or controllers. The bus system 805, therefore, may include, for example, a system bus, a Peripheral Component Interconnect (PCI) bus, a HyperTransport or industry standard architecture (ISA) bus, a small computer system interface (SCSI) bus, a universal serial bus (USB), or an Institute of Electrical and Electronics Engineers (IEEE) standard 1394 bus (sometimes referred to as "Firewire").

The processor(s) 802 are the central processing units (CPUs) of the processing system 800 and, thus, control its overall operation. In certain aspects, the processors 802 accomplish this by executing software stored in memory 804. The processors 802 may include, one or more programmable general-purpose or special-purpose microprocessors, digital signal processors (DSPs), programmable controllers, application specific integrated circuits (ASICs), programmable logic devices (PLDs), or the like, or a combination of such devices.

Memory 804 represents any form of random-access memory (RAM), read-only memory (ROM), flash memory, or the like, or a combination of such devices. Memory 804 includes the main memory of the processing system 800. Instructions 806 can be used to implement the data structures 502 and 506, and process blocks of FIGS. 3 and 4A-4F described above, may reside in and executed (by processors 802) from memory 804.

Also connected to the processors 802 through the bus system 805 are one or more internal mass storage devices 810, and a network adapter 812. Internal mass storage devices 810 may include any conventional medium for storing large volumes of data in a non-volatile manner, such as one or more magnetic or optical based disks, solid state drives, or any other storage media. The network adapter 812 provides the processing system 800 with the ability to communicate with remote devices (e.g., storage servers) over a network and can be, for example, an Ethernet adapter, a Fibre Channel adapter, or the like.

The processing system 800 also includes one or more input/output (I/O) devices 808 coupled to the bus system 805. The I/O devices 808 may include, for example, a display device, a keyboard, a mouse, etc.

Cloud Computing: The system and techniques described above are applicable and useful in the cloud computing environment. Cloud computing means computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. The term "cloud" is intended to refer to the Internet and cloud computing allows shared resources, for example, software and information to be available, on-demand, like a public utility.

Typical cloud computing providers deliver common business applications online which are accessed from another web service or software like a web browser, while the software and data are stored remotely on servers. The cloud computing architecture uses a layered approach for providing application services. A first layer is an application layer that is executed at client computers. In this example, the application allows a client to access storage via a cloud. After the application layer, is a cloud platform and cloud infrastructure, followed by a "server" layer that includes hardware and computer software designed for cloud specific services, for example, the storage system 108 is accessible as a cloud service. Details regarding these layers are not germane to the embodiments disclosed herein.

Thus, methods and systems for using a hierarchical CG in a networked storage environment have been described. Note that references throughout this specification to "one aspect" (or "embodiment") or "an aspect" mean that a particular feature, structure or characteristic described in connection with the aspect is included in at least one aspect of the present disclosure. Therefore, it is emphasized and should be appreciated that two or more references to "an aspect" or "one aspect" or "an alternative aspect" in various portions of this specification are not necessarily all referring to the same aspect. Furthermore, the particular features, structures or characteristics being referred to can be combined as suitable in one or more aspects of the disclosure, as will be recognized by those of ordinary skill in the art.

While the present disclosure is described above with respect to what is currently considered its preferred aspects, it is to be understood that the disclosure is not limited to that described above. To the contrary, the disclosure is intended to cover various modifications and equivalent arrangements within the spirit and scope of the appended claims.

What is claimed is:

1. A method executed by one or more processors, comprising:

detecting a failover condition associated with a primary storage system configured as a partner node of a secondary storage system, the primary storage system using an object model for representing a hierarchical consistency group (CG) with a parent CG associated with at least a first child CG and a second child CG, the first child CG and the second child CG configured to use one or more storage volumes to store data, the parent CG representing a plurality of applications, the first child CG representing a first application instance and the second child CG representing a second application instance;

wherein an atomic application programming interface (API) provisions storage for the parent CG, the first child CG and the second child CG, and stores a first policy for the parent CG, a second policy for the first child CG and a third policy for the second child CG, the first, second and third policy defining an attribute, a snapshot schedule, and a replication schedule for the parent CG, the first child CG and the second child CG, and the attribute indicating a difference between the first child CG, the second child CG and the parent CG, wherein the first policy is automatically updated, in response to a modification to the second policy or the third policy;

executing a single failover operation for recovery of the parent CG, the first child CG and the second child CG at the secondary storage system; and during the single failover operation, transferring a configuration data structure associated with the object model to the secondary storage system enabling the secondary storage system to update any configuration parameter associated with the parent CG, the first child CG and the second child CG.

2. The method of claim 1, wherein the failover condition is based on lack of network bandwidth available to the primary storage system.

3. The method of claim 1, wherein the failover condition is based on storage space utilization by the primary storage system reaching a threshold value.

4. The method of claim 1, wherein the failover condition is based on the primary storage system's inability to meet a service level objective.

5. The method of claim 1, wherein the single failover operation is executed as a planned event without detecting the failover condition.

6. The method of claim 1, further comprising:
selecting a storage service from a backup service, a replication service and a cloning service for the parent CG, the first child CG and the second child CG based on the first policy, the second policy and the third policy.

7. The method of claim 6, further comprising:
generating a clone of the parent CG, the first child CG and the second child CG in an atomic operation, based on a sequence specified by the attribute of the parent CG, the first child CG or the second child CG.

8. The method of claim 7, further comprising:
utilizing a first schedule to execute a backup operation to generate a snapshot of the parent CG, a second schedule to execute a backup operation to generate a snapshot of the first child CG; and a third schedule to execute a backup operation to generate a snapshot of the second child CG; the first, second and third schedule being different from each other defined by the first policy, the second policy and the third policy; and
linking snapshots of the parent CG, the first child CG and the second child CG to the object model using an attribute, and based on the attribute, determining member volumes of the parent CG, the first child CG and the second child CG for executing a restore operation using a single API call.

9. The method of claim 1, further comprising:
assigning a storage volume of the first child CG to the second child CG, while maintaining the assigned storage volume within the parent CG.

10. The method of claim 1, further comprising:
based on a data type stored by the first child CG and the second child CG, and configuration defined by the second and third policy, prior to the failover condition, replicating the first child CG at the secondary storage system using asynchronous replication and replicating the second child CG at the secondary storage system using synchronous replication.

11. A non-transitory machine-readable storage medium having stored thereon instructions comprising machine executable code, which when executed by a machine, causes the machine to:

detect a failover condition associated with a primary storage system configured as a partner node of a secondary storage system, the primary storage system using an object model for representing a hierarchical consistency group (CG) with a parent CG associated with at least a first child CG and a second child CG, the first child CG and the second child CG configured to use one or more storage volumes to store data, the parent CG representing a plurality of applications, the first child CG representing a first application instance and the second child CG representing a second application instance;

wherein an atomic application programming interface (API) provisions storage for the parent CG, the first child CG and the second child CG, and stores a first policy for the parent CG, a second policy for the first child CG and a third policy for the second child CG, the first, second third policy defining an attribute, a snapshot schedule, and a replication schedule for the parent CG, the first child CG and the second child CG, and the attribute indicating a difference between the first child CG, the second child CG and the parent CG; wherein the first policy is automatically updated, in response to a modification to the second policy or the third policy;

execute a single failover operation for recovery of the parent CG, the first child CG and the second child CG at the secondary storage system; and during the single failover operation, transfer a configuration data structure associated with the object model to the secondary storage system enabling the secondary storage system to update any configuration parameter associated with the parent CG, the first child CG and the second child CG.

12. The non-transitory machine-readable storage medium of claim 11, wherein the failover condition is based on lack of network bandwidth available to the primary storage system.

13. The non-transitory machine-readable storage medium of claim 11, wherein the failover condition is based on storage space utilization by the primary storage system reaching a threshold value.

14. The non-transitory machine-readable storage medium of claim 11, wherein the failover condition is based on the primary storage system's inability to meet a service level objective.

15. The non-transitory machine-readable storage medium of claim 11, wherein the single failover operation is executed as a planned event without detecting the failover condition.

16. A system, comprising:
a memory containing machine readable medium comprising machine executable code having stored thereon instructions; and a processor coupled to the memory to execute the machine executable code to:
detect a failover condition associated with a primary storage system configured as a partner node of a secondary storage system, the primary storage system using an object model for representing a hierarchical consistency group (CG) with a parent CG associated with at least a first child CG and a second child CG, the first child CG and the second child CG configured to use one or more storage volumes to store data, the parent CG representing a plurality of applications, the first child CG representing a first application instance and the second child CG representing a second application instance;

wherein an atomic application programming interface (API) provisions storage for the parent CG, the first child CG and the second child CG, and stores a first policy for the parent CG, a second policy for the first child CG and a third policy for the second child CG, the first, second and third policy defining an attribute, a snapshot schedule, and a replication schedule for the parent CG, the first child CG and the second child CG, and the attribute indicating a difference between the first child CG, the second child CG and the parent CG;

wherein the first policy is automatically updated, in response to a modification to the second policy or the third policy;

execute a single failover operation for recovery of the parent CG, the first child CG and the second child CG at the secondary storage system; and during the single failover operation, transfer a configuration data structure associated with the object model to the secondary storage system enabling the secondary storage system to update any configuration parameter associated with the parent CG, the first child CG and the second child CG.

17. The system of claim 16, wherein the failover condition is based on lack of network bandwidth available to the primary storage system.

18. The system of claim 16, wherein the failover condition is based on storage space utilization by the primary storage system reaching a threshold value.

19. The system of claim 16, wherein the failover condition is based on the primary storage system's inability to meet a service level objective.

20. The system of claim 16, wherein the single failover operation is executed as a planned event without detecting the failover condition.

* * * * *